(12) United States Patent
Terrels et al.

(10) Patent No.: US 7,744,065 B2
(45) Date of Patent: Jun. 29, 2010

(54) RAILING ASSEMBLY WITH DETACHABLE AND UPGRADEABLE COMPONENTS

(75) Inventors: Christopher J. Terrels, Ocean View, NJ (US); Christopher Michael Schneider, Mays Landing, NJ (US)

(73) Assignee: Railing Dynamics, Inc., Egg Harbor Township, NJ (US)

( * ) Notice: Subject to any disclaimer, the term of this patent is extended or adjusted under 35 U.S.C. 154(b) by 6 days.

(21) Appl. No.: 11/913,386

(22) PCT Filed: May 1, 2006

(86) PCT No.: PCT/US2006/016735

§ 371 (c)(1),
(2), (4) Date: Nov. 13, 2007

(87) PCT Pub. No.: WO2006/119246

PCT Pub. Date: Nov. 9, 2006

(65) Prior Publication Data

US 2008/0265232 A1 Oct. 30, 2008

Related U.S. Application Data

(60) Provisional application No. 60/757,739, filed on Jan. 10, 2006, provisional application No. 60/677,285, filed on May 3, 2005.

(51) Int. Cl.
*E04H 17/14* (2006.01)
(52) U.S. Cl. .............................. 256/59; 256/19; 256/21
(58) Field of Classification Search .................. 256/19, 256/21, 59, 65.03, 65.04, 65.06, 65.08
See application file for complete search history.

(56) References Cited

U.S. PATENT DOCUMENTS

| 3,482,819 | A | | 12/1969 | Leurent |
| 4,027,855 | A | * | 6/1977 | Lauzier ..................... 256/21 |
| 4,108,422 | A | | 8/1978 | Fleischmann et al. |

(Continued)

FOREIGN PATENT DOCUMENTS

CA 1 213 767 12/1986

(Continued)

OTHER PUBLICATIONS

International Search Report for PCT/US2006/016735; Date Completed Sep. 28, 2006; Date Mailed Apr. 10, 2007.

*Primary Examiner*—Michael P Ferguson
(74) *Attorney, Agent, or Firm*—RatnerPrestia

(57) ABSTRACT

A railing system includes an upper core member having a cap connector. In a first embodiment, a railing system includes a cap member having a cap flange that detachably couples with the cap connector on the upper core member. The cap member forms an enclosed conduit between the cap member and the upper core member. In a second embodiment, a kit for fabricating a railing span is contained in a packaging. The kit includes an upper core member and lower core member having selected lengths and a plurality of balusters for connection between the upper and lower core members. In a third aspect of the invention, a method of routing an opening for a baluster used in an inclined railing structure includes the step of plunging a router bit into a side of a component at an angle based on the installed angle of the inclined railing structure.

17 Claims, 23 Drawing Sheets

U.S. PATENT DOCUMENTS

| | | | |
|---|---|---|---|
| 4,334,671 A * | 6/1982 | De Guise | 256/65.12 |
| 4,805,879 A * | 2/1989 | Spera | 256/65.12 |
| 5,794,390 A * | 8/1998 | Oliveri et al. | 256/19 |
| 5,938,184 A * | 8/1999 | DeSouza | 256/19 |
| 6,061,991 A * | 5/2000 | Dahl | 256/59 |
| 6,874,766 B2 * | 4/2005 | Curatolo | 256/59 |
| 2004/0051092 A1 | 3/2004 | Curatolo | |

FOREIGN PATENT DOCUMENTS

| | | |
|---|---|---|
| CA | 2 468 481 | 11/2004 |
| FR | 2 529 925 | 1/1984 |

\* cited by examiner

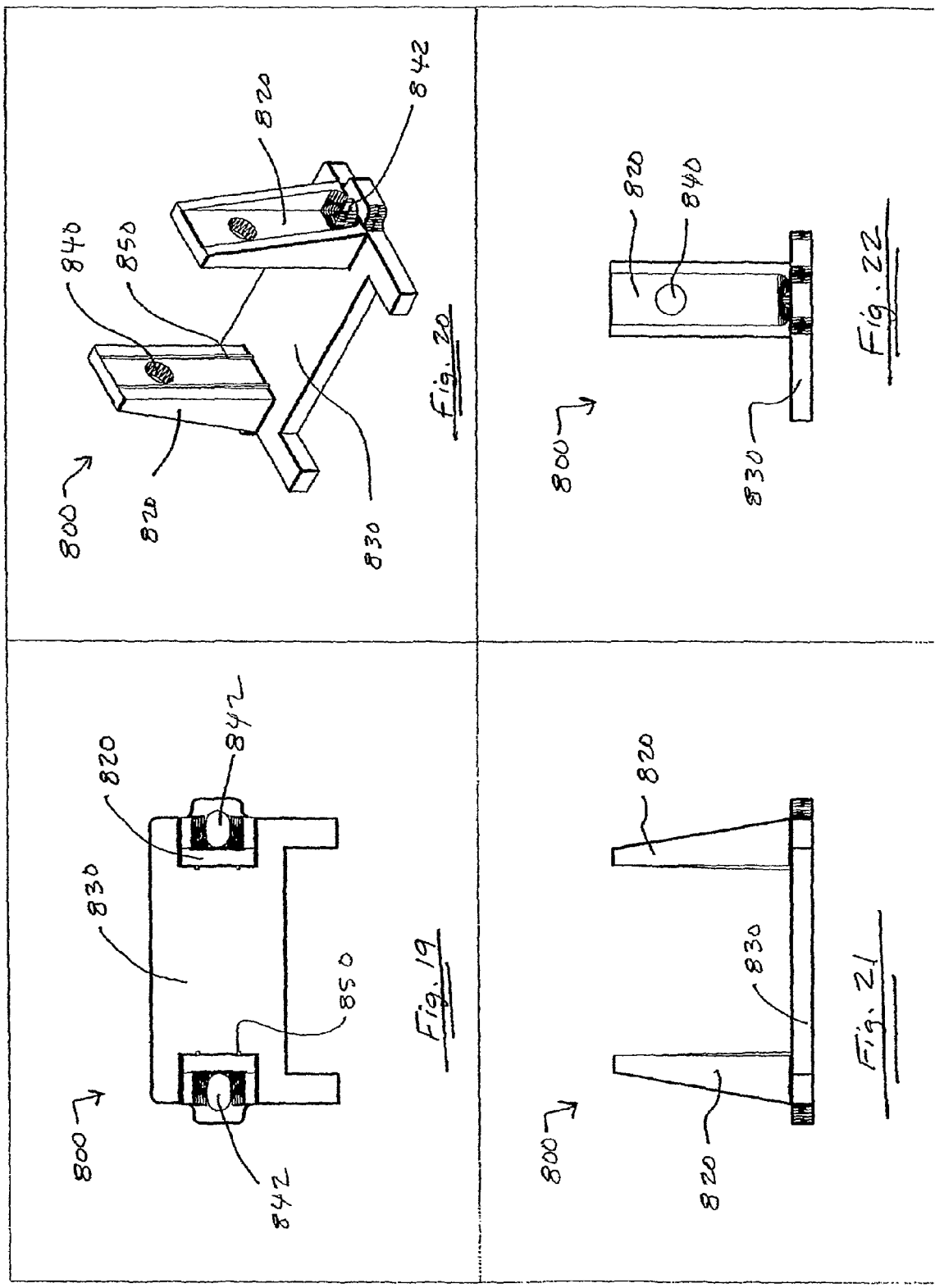

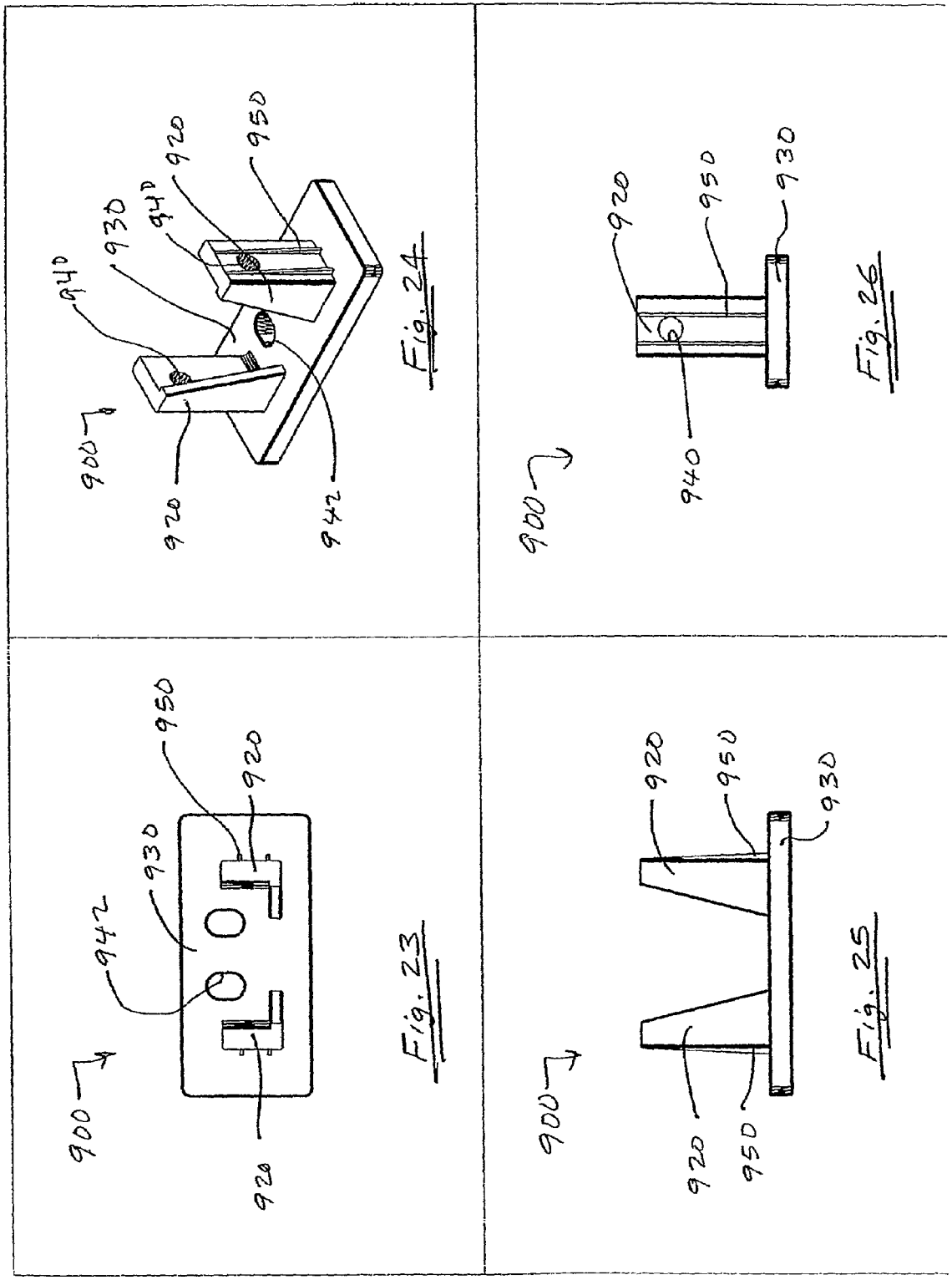

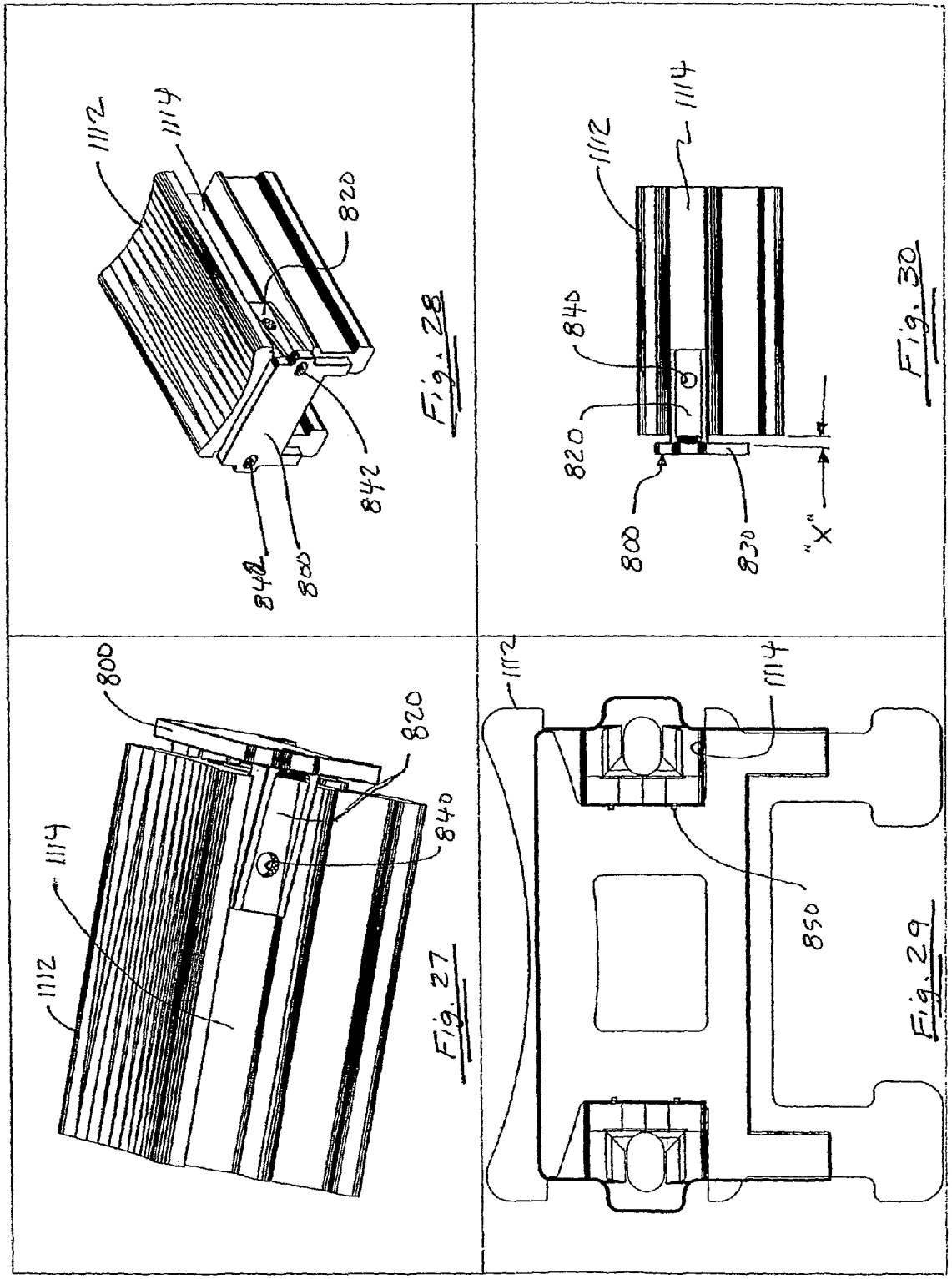

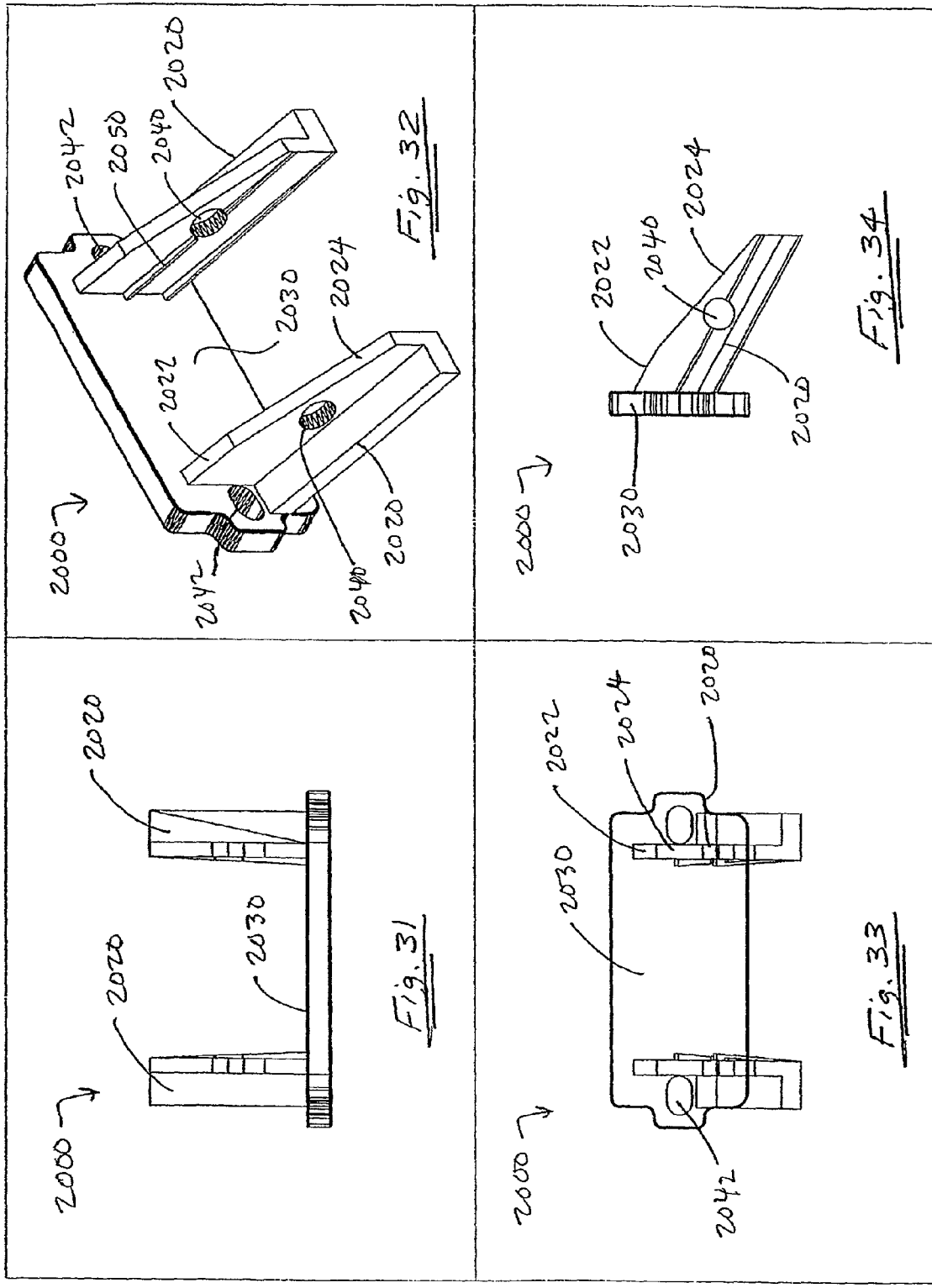

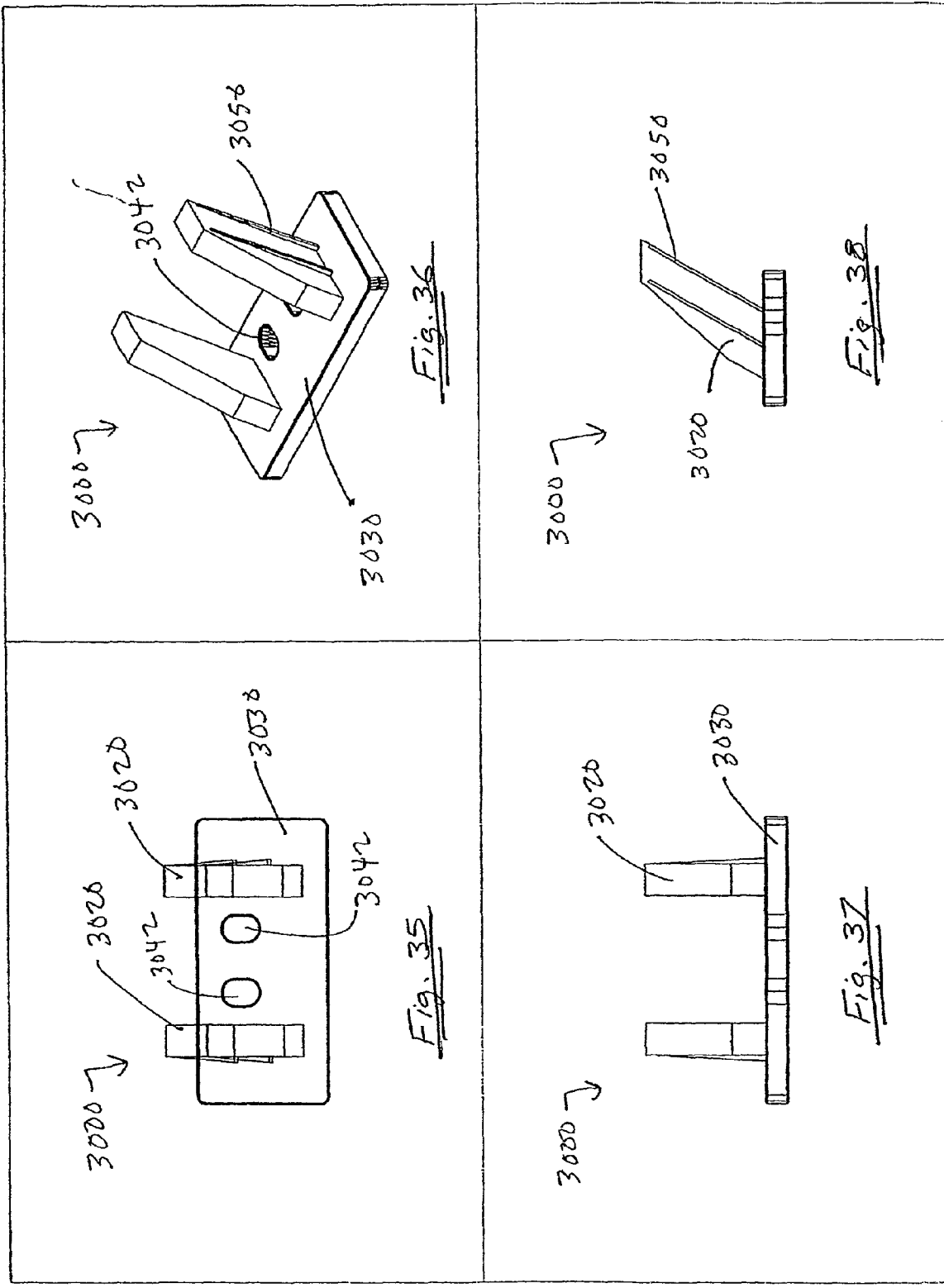

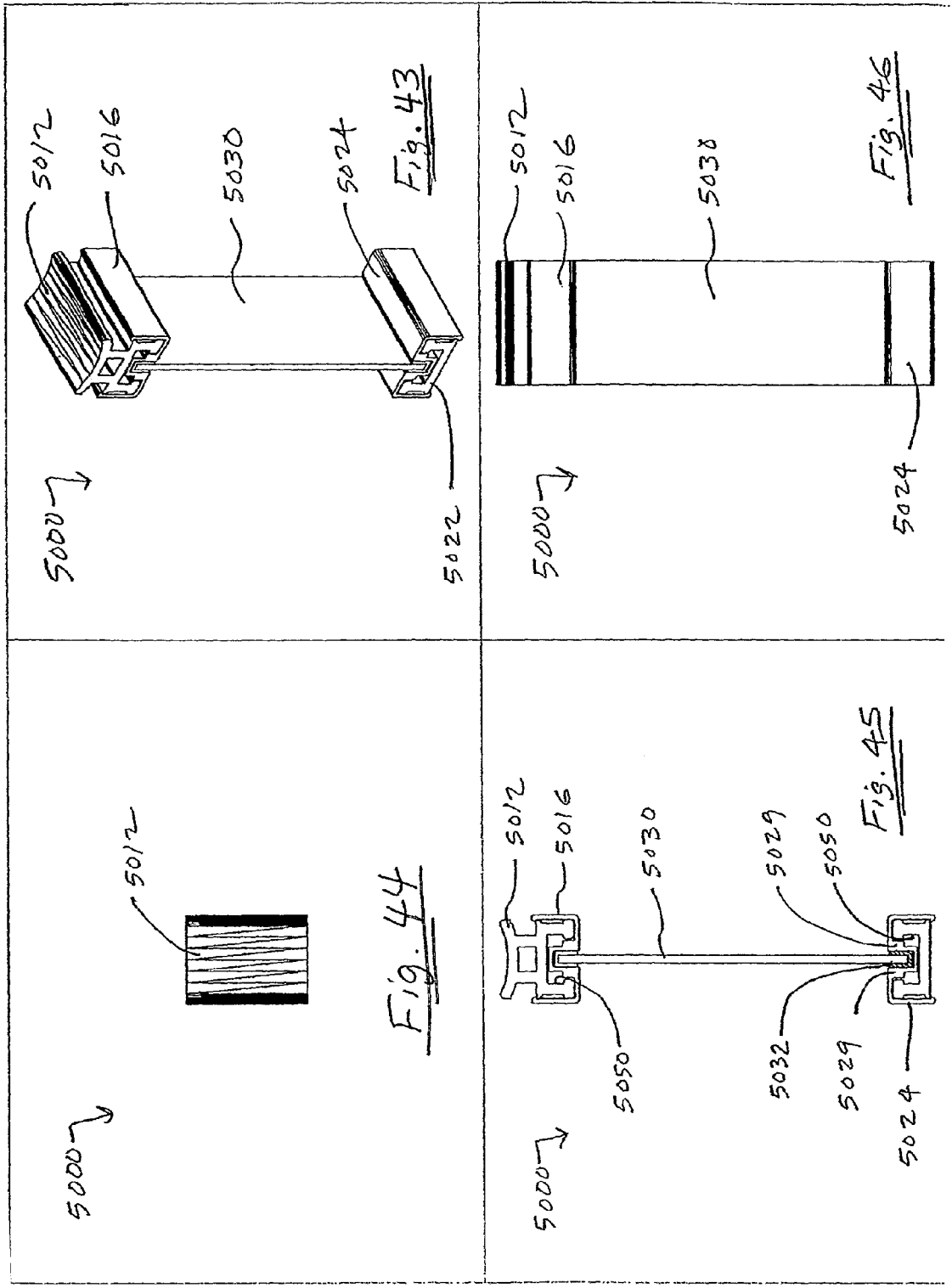

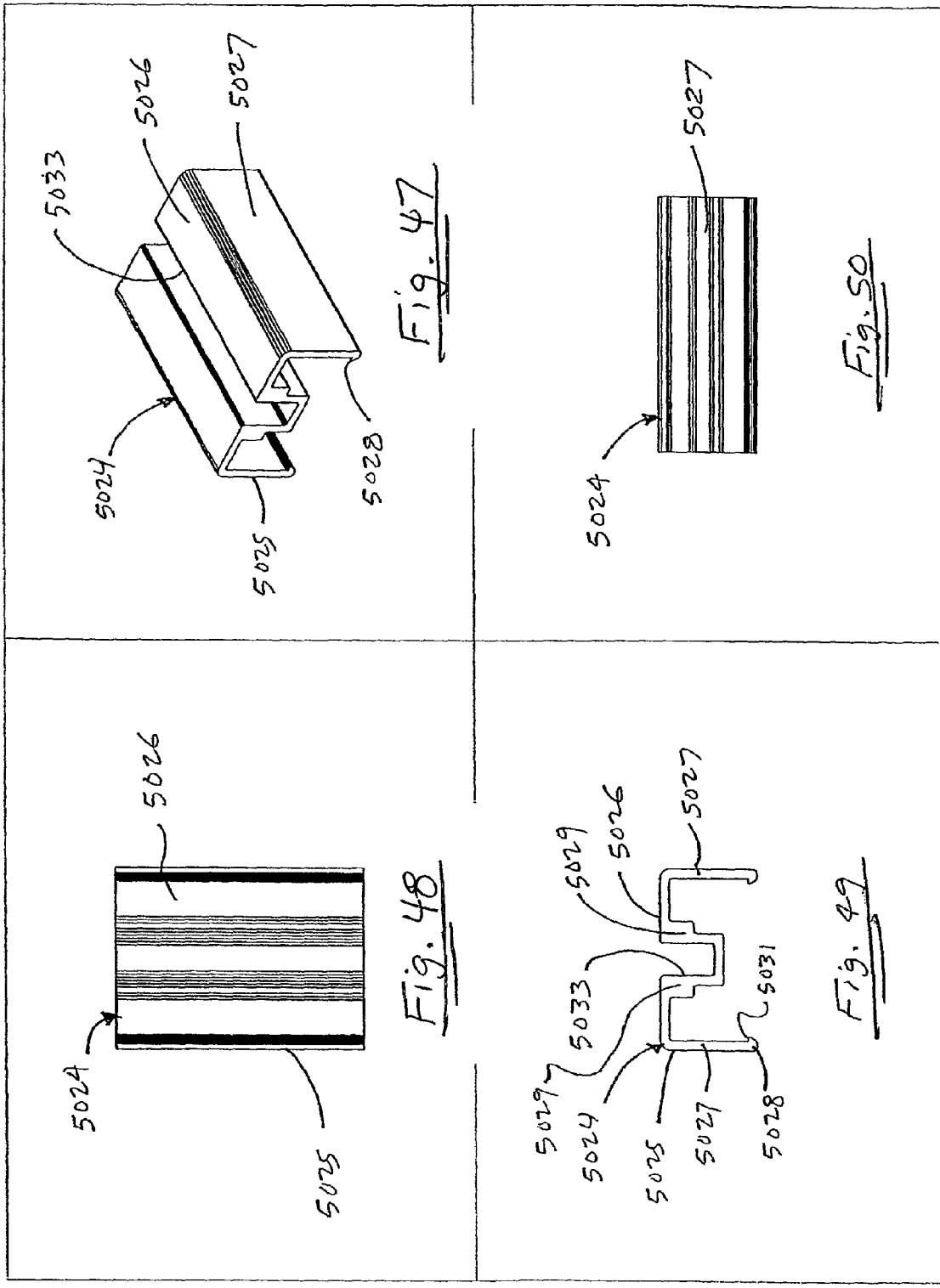

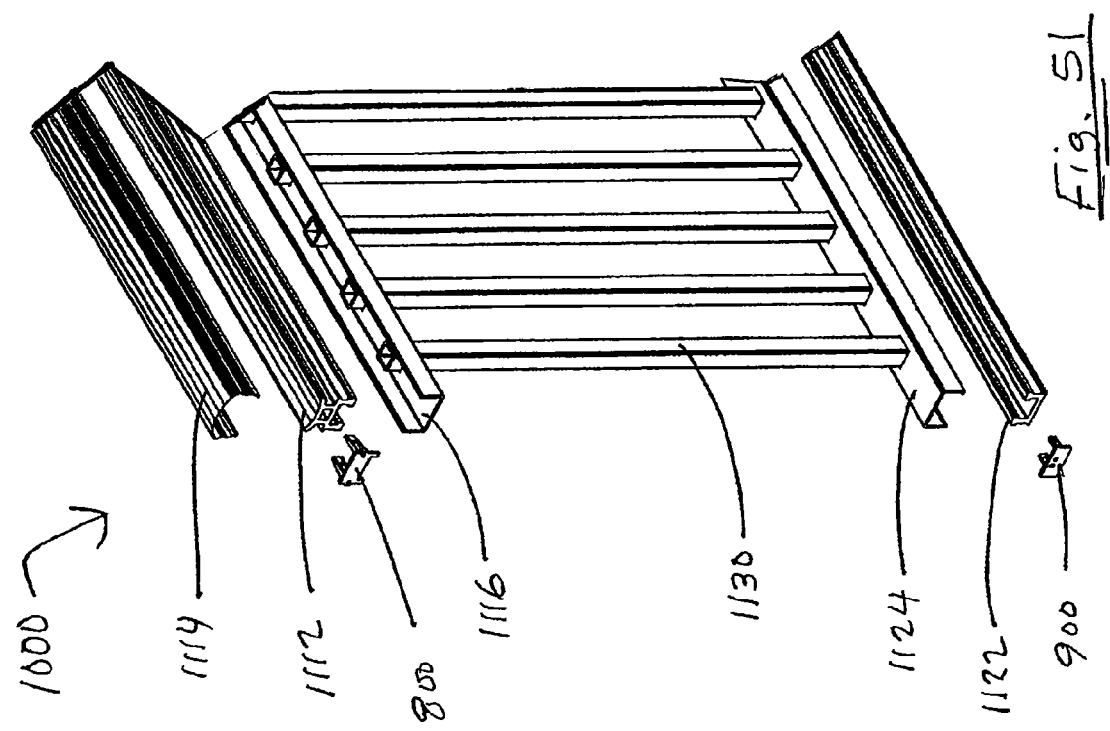

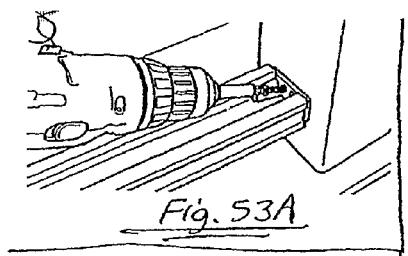
Fig. 53A
Fig. 53B
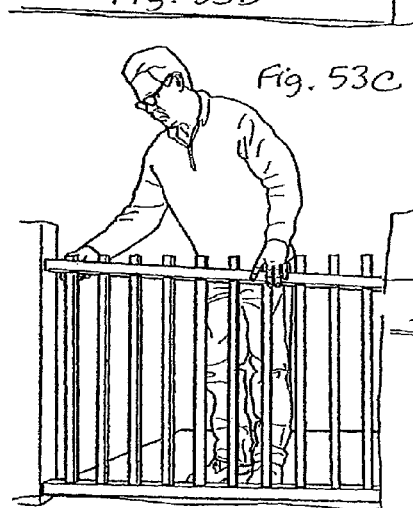
Fig. 53C
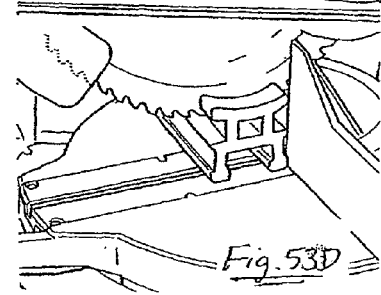
Fig. 53D
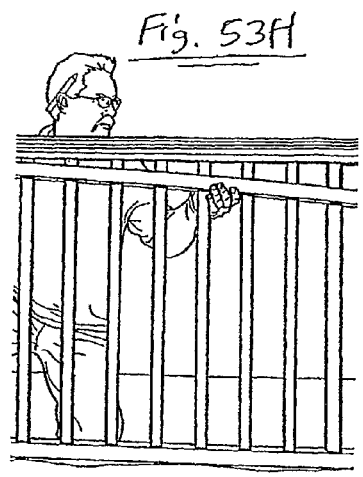
Fig. 53H
Fig. 53G
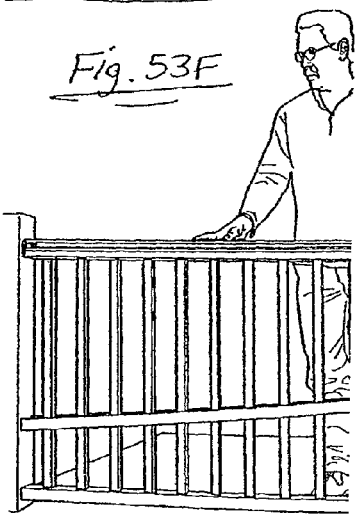
Fig. 53F
Fig. 53E

RAILING ASSEMBLY WITH DETACHABLE AND UPGRADEABLE COMPONENTS

RELATED APPLICATIONS

This application is a U.S. National Phase Application of PCT International Application PCT/US2006/016735, filed May 1, 2006, the contents of which are incorporated by reference. This application claims the benefit of U.S. Provisional Application No. 60/757,739, filed Jan. 10, 2006, and further claims the benefit of U.S. Provisional Application No. 60/677,285, filed May 3, 2005, the contents of both applications being incorporated by reference herein.

FIELD OF THE INVENTION

The present invention relates to outdoor railing systems, and particularly to outdoor railing assemblies having detachable hollow components to permit installation and servicing of cable, wiring and utility lines through the railing system after the railing system is installed.

BACKGROUND

Outdoor railing structures, such as handrails for decks and terraces, are constructed of a variety materials. Many manufacturers and builders of railing structures use polyvinylchloride (PVC) and other plastics to form railing components. Plastic materials require less maintenance than wood, and provide exceptional durability in outdoor installations. In a typical plastic railing system, a pair of closed tubular rails (top and bottom rails) extend parallel to one another between vertical posts or columns. The space between the top and bottom rails is occupied by a series of balusters that connect between the rails.

There are certain drawbacks in using closed tubular rails in a railing system. Closed tubular rails are typically connected to balusters by cutting routed openings in the rails and inserting the ends of the balusters into the hollow interior of the rails. The routed openings introduce areas of relative weakness, called "fracture points", along the span of the rail. This is a significant concern, since the top and bottom rails are the primary load bearing components in the railing structure. Railing systems that are intended for use in residential construction must be tested to ensure that they support minimum load requirements. Load bearing rails that fail to meet the minimum load requirements can not be used for residential construction. Therefore, closed tubular rails with routed openings have certain limitations that may affect whether or not they can be used in a given project.

Structural integrity has been addressed in the past by adding reinforcing members to the railing components. For example, closed tubular rail systems have been installed with aluminum stiffeners inserted in the hollow interior of the rails. Although aluminum stiffeners increase structural integrity, they may not be desirable in every case. Compared to plastic material, aluminum stiffeners are relatively difficult to cut to a specified length. In addition, insertion of stiffeners into plastic railing components adds additional steps to the installation process.

Closed tubular rails also limit the ability to run wires, cables and utility lines along the railing structure. In most instances, the wiring is simply affixed to the exterior of the closed tubular rail. This leaves the wiring visible on the exterior of the railing, which can detract from the appearance of the railing. In addition, the size and shape of the railing may not allow for more than a few wires to be run along the railing.

It may be possible to route the wiring through the interior of the closed tubular railing, but this necessitates cutting into the railing to gain access to the interior of the railing. The process of feeding wiring through a closed tubular rail may be further complicated by posts or other components that divide sections of rail and obstruct the hollow interior of the closed rails. Therefore, the process of cutting into an installed railing can require significant time and labor. Cutting through the sides of plastic rails also leaves holes that may detract from the appearance of the railing system.

Known plastic railing systems involve a number of competing interests. Examples of competing interests include the appearance of railing assembly and the ease of installation. It has been found that when an assembly is modified to address one of these objectives, the other objective is sacrificed. This balancing act between appearance and ease of installation is commonly observed with visible hardware. Systems that do not conceal hardware are relatively simple to install, since they usually require fewer components and steps for assembling. In contrast, many known systems that are designed to conceal hardware require the handling of more components, which increase the time and expense for installing the railing assembly.

The goal of improving aesthetic appearance also competes with the goal of providing structural integrity. As noted above, the use of routed openings to connect balusters with railing components provides a neat and virtually seamless appearance. Unfortunately, routed openings can create fracture zones that compromise the structural integrity of the railing system.

Based on the foregoing, there is much room for improvement in existing railing systems. Among other needs, there is a need for railing systems which are more capable of satisfying competing interests.

SUMMARY OF THE INVENTION

In a first aspect of the invention, a railing system includes an upper core member having an upper portion and a lower portion, the upper portion including a cap connector, and the lower portion including a base connector. The railing system includes a cap member having a cap flange that detachably couples with the cap connector on the upper core member. The cap member has a hollow interior forming an enclosed conduit between the cap member and the upper core member. The railing system also includes a base member having a base flange detachably coupled with the base connector on the upper core member. The base member and the cap member substantially enclose the upper core member.

In a second aspect of the invention, a kit for fabricating a railing span having a selected length is contained in a packaging. The kit includes an upper core member having the selected length, a lower core member having the selected length, and a plurality of balusters for connection between the upper and lower core members at a selected uniform spacing.

In a third aspect of the invention, a method of routing an opening for a baluster used in an inclined railing structure includes the steps of determining the installed angle of the inclined railing structure relative to horizontal, providing a router with a router bit, selecting a router bit angle based on the installed angle of the inclined railing structure, pivoting the router bit to the selected router bit angle, and plunging the router bit into a side of a component into which the baluster will be inserted, with the side being oriented horizontally.

DESCRIPTION OF THE DRAWINGS

The foregoing summary and the following description will be better understood when read in conjunction with the figures in which:

FIG. 19 is a front elevation view of a fourth bracket in accordance with the present invention.

FIG. 20 is a perspective view of the fourth bracket of FIG. 19.

FIG. 21 is a bottom elevation view of the fourth bracket of FIG. 19.

FIG. 22 is a side elevation view of the fourth bracket of FIG. 19.

FIG. 23 is a front elevation view of a fifth bracket in accordance with the present invention.

FIG. 24 is a perspective view of the fifth bracket of FIG. 23.

FIG. 25 is a bottom elevation view of the fifth bracket of FIG. 23.

FIG. 26 is a side elevation view of the fifth bracket of FIG. 23.

FIG. 27 is a first perspective view of the fourth bracket of FIG. 19 connected to an upper core member in accordance with the present invention, wherein the upper core element is truncated for clarity.

FIG. 28 is a second perspective view of the fourth bracket and upper core member of FIG. 27.

FIG. 29 is a front elevation view of the fourth bracket and upper core member of FIG. 27.

FIG. 30 is a side elevation view of the fourth bracket and upper core member of FIG. 27.

FIG. 31 is a top elevation view of a sixth bracket in accordance with the present invention.

FIG. 32 is a perspective view of the sixth bracket of FIG. 31.

FIG. 33 is a front elevation view of the sixth bracket of FIG. 31.

FIG. 34 is a side elevation view of the sixth bracket of FIG. 31.

FIG. 35 is a front elevation view of a seventh bracket in accordance with the present invention.

FIG. 36 is a perspective view of the seventh bracket of FIG. 35.

FIG. 37 is a top elevation view of the seventh bracket of FIG. 35.

FIG. 38 is a side elevation view of the seventh bracket of FIG. 35.

FIG. 43 is a perspective view of components forming an alternate railing span in accordance with the present invention, wherein the railing span is truncated for clarity.

FIG. 44 is a top view of the railing span of FIG. 43.

FIG. 45 is an end view of the railing span of FIG. 43.

FIG. 46 is a side elevation view of the railing span of FIG. 43.

FIG. 47 is a perspective view of a decorative component used in the railing span of FIG. 43, wherein the decorative component is truncated for clarity.

FIG. 48 is a top view of the decorative component of FIG. 47.

FIG. 49 is an end view of the decorative component of FIG. 47.

FIG. 50 is a side elevation view of the decorative component of FIG. 47.

FIG. 51 is an exploded perspective view of an exemplary railing system in accordance with the present invention, wherein certain components are truncated for clarity.

FIGS. 53A-53H are schematic views illustrating steps for assembling an exemplary railing system in accordance with the present invention.

DETAILED DESCRIPTION OF THE PREFERRED EMBODIMENTS

The drawbacks associated with closed tubular railing assemblies are addressed to a great degree by a railing system in accordance with the present invention, which features structural core members having detachable cover elements. The detachable cover elements permit access to the interior of the assembly without cutting into the assembly or dismantling rails from the support structure. Therefore, cover elements can be detached, for instance, to run utility wiring through the railing system. In addition, the detachable cover elements allow for design flexibility, so that the owner can incorporate different decorative components into the railing system, change decorative components as desired, and replace damaged components, without disassembling or modifying the structural components that support the railing.

Figure 1:
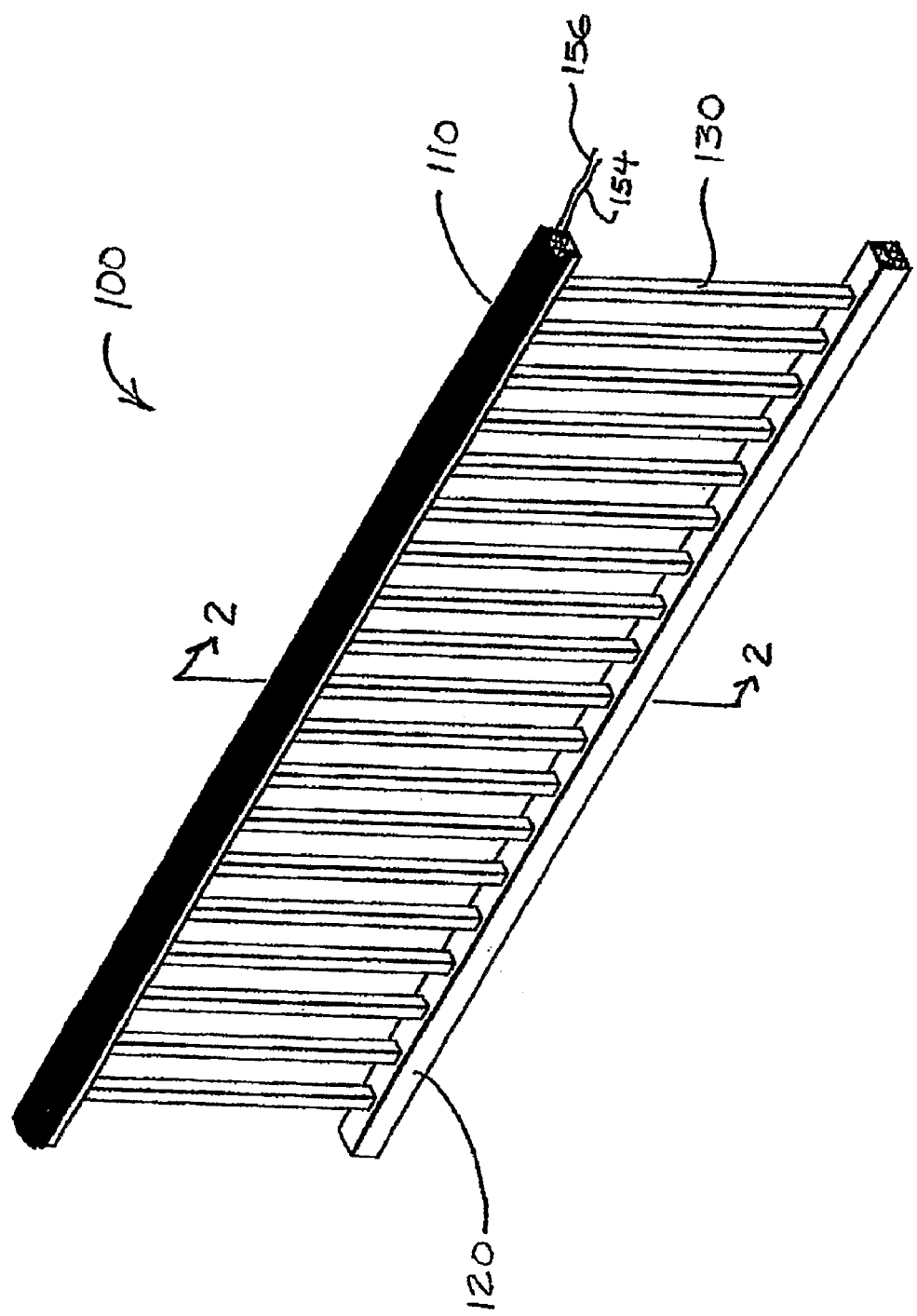
FIG. 1 is a perspective view of a railing span in accordance with the present invention.

Referring now to the drawing figures in general, and to FIG. 1 specifically, a railing span 100 is shown. The span 100 includes an upper rail 110 and a lower rail 120 that extends generally parallel to the upper rail. The upper and lower rails 110, 120 are separated by a series of balusters 130. The railing span 100 may be installed between a pair of support elements, including but not limited to posts, columns or walls. For purposes of this description, the railing span 100 will be described in connection with a railing system that extends along the periphery of a deck, terrace, or other elevated structure. Of course, the railing span 100 is not intended solely for elevated structures, and may be used in any location where a railing installation is desired.

Figure 2:
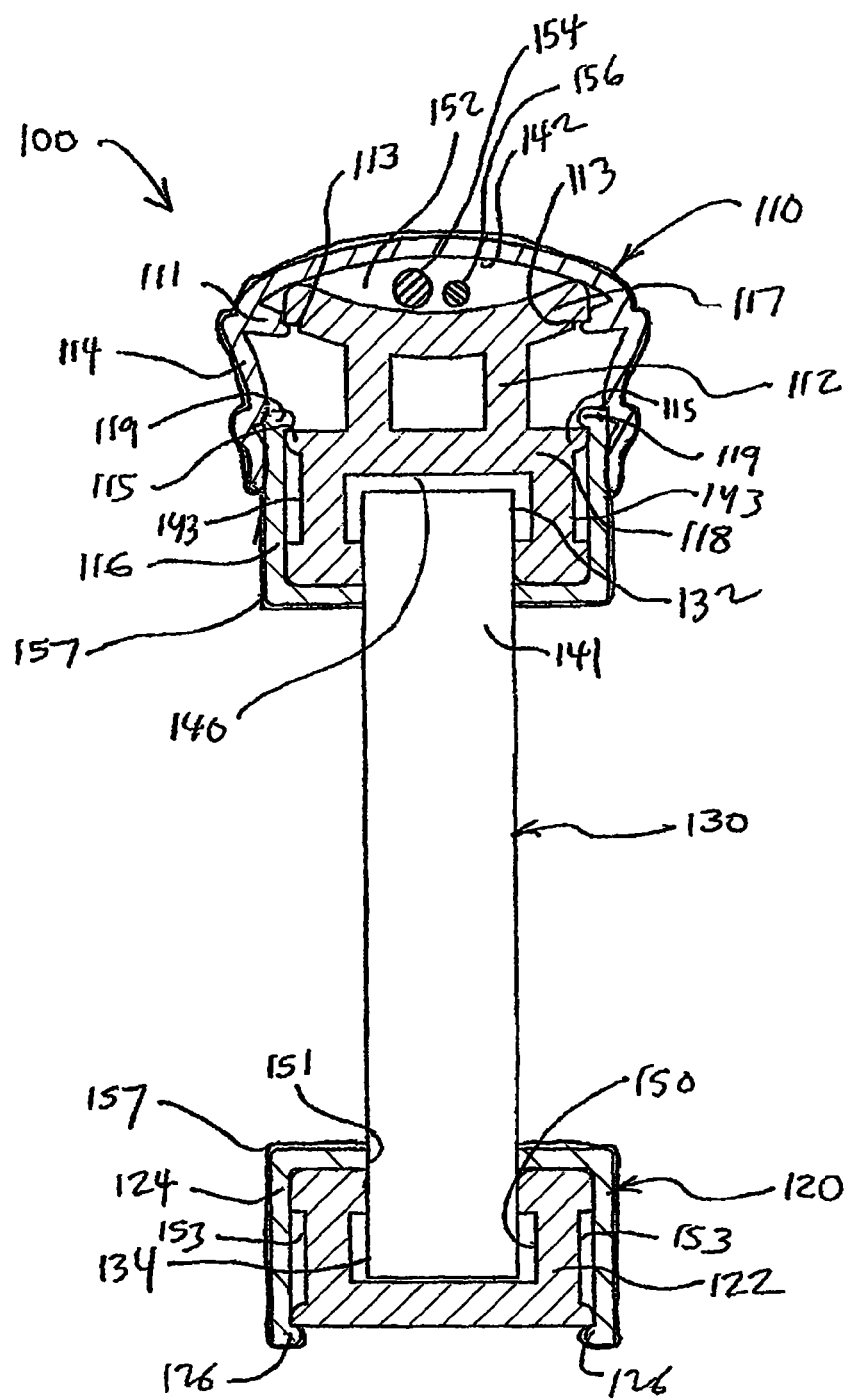
FIG. 2 is a cross section view of a the railing span of FIG. 1, taken through line 2-2 of FIG. 1.

Referring to FIG. 2, the internal components of the railing span 100 are shown in more detail. The upper rail 110 includes an upper core member 112, and the lower rail 120 includes a lower core member 122. The upper and lower core members 112, 122 are rigid load bearing components that provide internal support for the railing span 100. Each core member may be formed of a structural material that distributes loads along the length of the rail, including but not limited to aluminum, wood or a variety of composites containing wood, plastics and other additives.

In a preferred embodiment, the core members contain wood composites, such as wood dust or wood fibers mixed with plastic or encapsulated in a thermoplastic polymer. The use of wood composites is preferred because they are easy to cut in the field and do not rot, splinter or deteriorate like ordinary wood. Wood composites have also shown the unexpected benefit of providing enough strength under load to eliminate the need for reinforcements, like aluminum stiffeners. The core members 112, 122 may be connected with posts, columns, walls or other support structures to anchor the railing span 100 on a deck, as discussed in more detail below.

Figure 54:
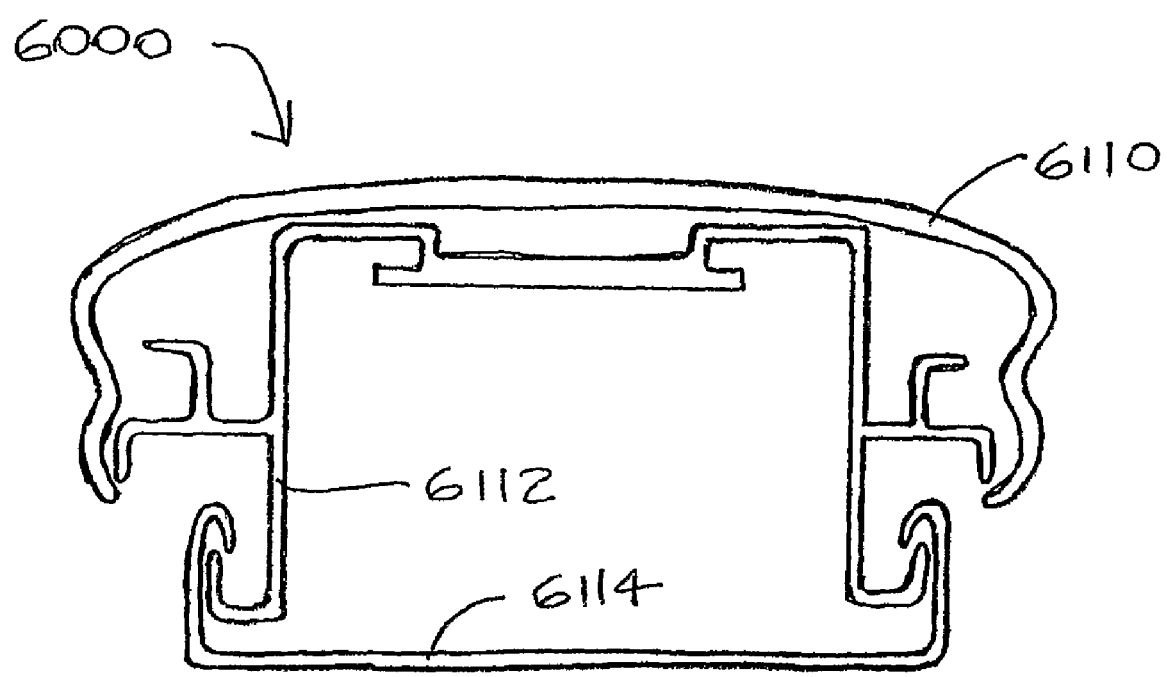
FIG. 54 is a cross section view of a railing span with a fifth core member in accordance with the present invention.

As an alternative to wood or wood composite material, the core members may be formed of an aluminum extrusion. Referring now to FIG. 54, a railing span 6000 is shown with an upper core member 6112 formed of an aluminum extrusion with a first cross-sectional configuration. The upper core member 6112 cooperatively engages with decorative cover members, which will be explained below in more detail. Upper core member 6112 has an upper portion that detachably engages a decorative hand rail cover 6110. The upper core member 6112 also has a lower portion that detachably engages a decorative cover 6114. The decorative covers 6110, 6114 are easily removable from upper core member 6112 without the use of hand tools. This allows the covers 6110, 6114 to be replaced with other covers without disassembling the structural elements of the installed railing. The removable covers are removable by hand, and can be replaced at any time with covers having different aesthetic outer configurations, and/or covers having different internal configurations that are specially adapted to house wires, conduits or other components being run within the railing. Covers 6110, 6114 substantially enclose the upper core member 6112 so that the core member is not visible on the exterior of the railing.

Figure 55:
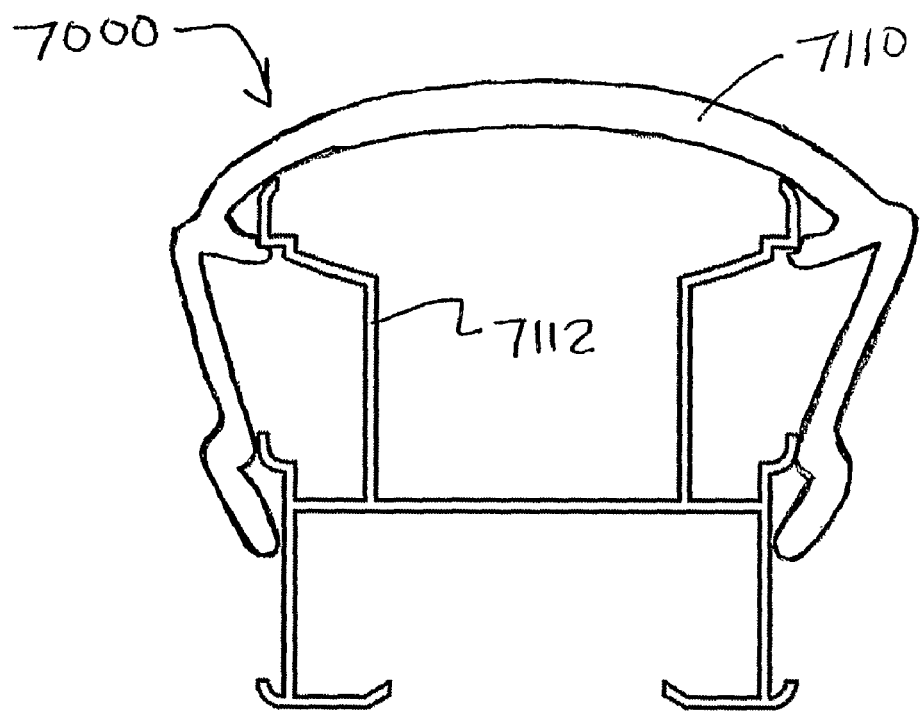
FIG. 55 is a cross section view of a railing span with a sixth core member in accordance with the present invention.
Figure 56:
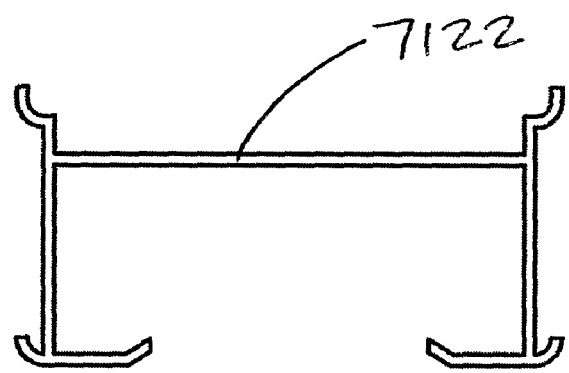
FIG. 56 is a cross section view of a seventh core member in accordance with the present invention.

FIG. 55 shows a railing span 7000 with an upper core member 7112 formed of an aluminum extrusion with a second cross-sectional configuration. Upper core member 7112 has an upper portion that cooperatively engages a decorative cap member 7110. Like the covers in FIG. 54, cap member 7110 is detachable from upper core member 7112 without the use of hand tools. FIG. 56 shows a lower core member 7122 formed of an aluminum extrusion that may be sold and used with the components shown in FIG. 55.

As noted above, the core members of the present invention are surrounded by one or more detachable cover elements that substantially enclose and conceal the core members. The cover elements provide a decorative exterior or facade around the internal core members, while the core members are load bearing members that provide the support for the railing span 100. The core members form a skeleton that provides the structural integrity of the railing system, while the cover elements essentially "float" on the core members. This arrangement allows the manufacturer or installer to cut routed openings through the cover elements to receive the balusters 130. Because the routed openings are cut into the cover elements, and not the load bearing core members, the routed openings do not create fracture zones or other issues that can undermine the structural integrity of the railing system.

Figure 3:
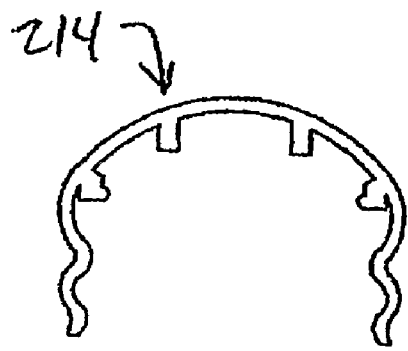
FIG. 3 is a cross section view of a first cap member in accordance with the present invention.
Figure 4:
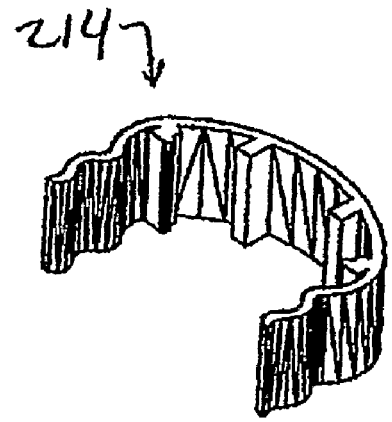
FIG. 4 is a perspective view of the first cap member of FIG. 3, which is truncated for clarity.
Figure 5:
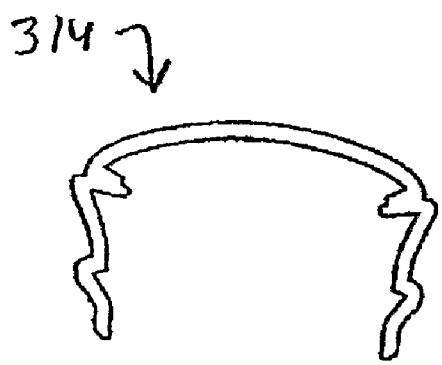
FIG. 5 is a cross section view of a second cap member in accordance with the present invention.
Figure 6:
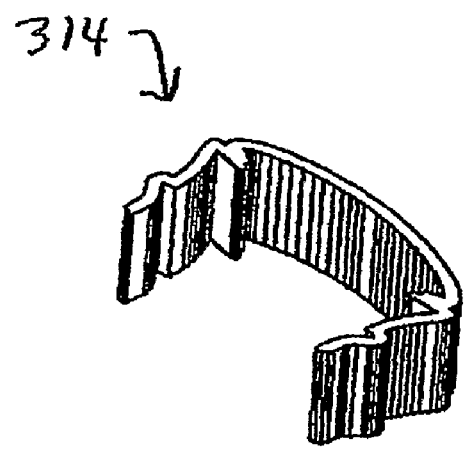
FIG. 6 is a perspective view of the second cap member of FIG. 5, which is truncated for clarity.
Figure 15:
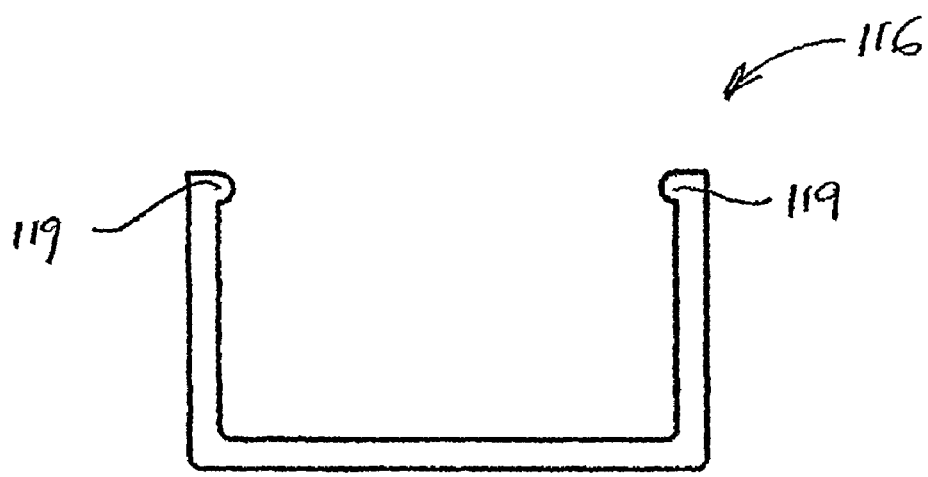
FIG. 15 is a cross section view of a third cap member in accordance with the present invention.
Figure 16:
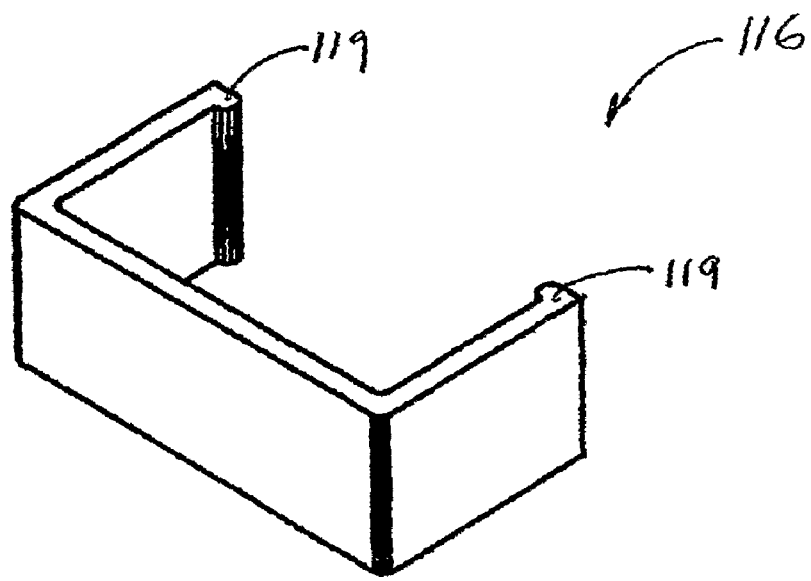
FIG. 16 is a perspective view of the third cap member of FIG. 15, which is truncated for clarity.

In the embodiment shown in FIG. 2, the cover elements include a cap member 114 and a base member 116 which enclose or substantially enclose the upper core member 112. The upper core member 112 has an upper flange portion 117 and a lower flange portion 118. The upper portion 117 has a pair of cap connectors 113 that engage with the cap member 114. The lower portion 118 has a pair of base connectors 115 that engage with the base member 116. The upper core member 112, cap member 114 and base member 116 may be formed with a variety of cooperating engagements that facilitate interconnection between components. FIGS. 3 and 4 illustrate a cap member 214 having one possible geometry, and FIGS. 5 and 6 illustrate a cap member 314 having another possible geometry. Base member 116 is shown in more detail in FIGS. 15 and 16.

In FIG. 2, cap member 114 includes a pair of cap flanges 111. The cap flanges 111 mate with or cooperatively engage the cap connectors 113 on the upper core member 112. The cap connectors 113 may include longitudinal ridges or edges that engage with the cap flanges 111. Base member 116 includes a pair of base flanges 119. The base flanges 119 mate with or cooperatively engage the base connectors 115 on the upper core member 112. The base connectors 115 may include corner edges that engage with the base flanges 116. The internal geometries of the cap member 114 and base member 116 may be formed with resilient flexible flanges, ridges, hubs, or other elements that snap over the exterior of the upper core member 112 and firmly hold the cap member and base member on the core member, without the use of fasteners or adhesives. The snapping connection between components allows the cap member 114 and base member 116 to be readily attached and removed by hand, without the use of tools.

In the preferred embodiment, the cap flanges 111, cap connectors 113, base flanges 119 and base connectors 115 have rounded edges so that the mating surfaces slide over one another with minimal resistance when the cap member 114 and base member 116 are snapped onto the core member 112. The side portions of the cap member 114 and base member 116 are resiliently flexible. The cap flanges 111 are spaced apart at a distance which is slightly less than the width of the upper portion 117 of the upper core member 112. Similarly, the base flanges 119 are spaced apart at a distance that is slightly less than the width of the lower portion 118 of the upper core member 112. In this arrangement, the cap flanges 111 flex outwardly with respect to the longitudinal axis of the cap member 114 as the cap member is pressed downwardly onto the upper core member. Similarly, the base flanges 119 flex outwardly with respect to the longitudinal axis of the base member 116 as the base member is pressed upwardly onto the upper core member. The cap flanges 111 and base flanges 119 remain flexed outwardly until they pass the cap connectors 113 and base connectors 115, respectively, after which the resilience of the cap flanges and base flanges displaces or "snaps" them inwardly and back to their original configuration. In this position, the cap flanges 111 and base flanges 119 engage the cap connectors 113 and base connectors 115, respectively, to detachably secure to the cap member 114 and base member 116 to the upper core member.

The lower core member 122 is surrounded by a cover member 124. The cover member 124 has a pair of cover flanges 126 that engage with the exterior of the lower core member 122. As with the cap member 114 and base member 116, the internal geometry of the cover member 124 may be formed with resilient flexible flanges, ridges, hubs, or other elements that snap over the exterior of the lower core member 122 to secure the cover member on the lower core member without the use of fasteners or adhesives.

The cap member 114, base member 116 and cover member 124 (hereinafter collectively referred to as the "cover elements") may be formed of PVC. Alternatively, the cover elements may be formed of wood or a variety of composites containing wood, plastics and other additives. In a preferred embodiment, the cover elements contain wood composites formed of wood dust or wood fibers mixed with plastic or encapsulated in a thermoplastic polymer. As described in more detail below, the selection of wood and plastic composites, combined with the selection of detachable cap members, provides a new and unique set of advantages. The wood component of the material allows the cover elements to be painted or stained to match an adjoining building or other feature. Meanwhile, the plastic component of the material provides a resilient flexibility that permits the cover elements to be attached and removed from the core members. Accordingly, the cover elements are easily detachable so that they can be painted or stained, apart from the rest of the railing structure. This allows the cover elements to be painted or stained more easily. Alternatively, the cover elements can be removed and replaced with other cover elements.

As noted above, the cross-sectional configuration of the core members permit the core members to cooperatively engage with the cover elements. It will be apparent to those skilled in the art that an infinite number of cross-sectional configurations may be chosen for the core members, whether the core members are formed of wood, wood composite, aluminum extrusions, or other materials. Therefore, the particular cross-sectional shape selected for a core member is not critical. A number of cross-sectional shapes may be used which cooperatively engage cap members and cover members. This flexibility of design has many advantages. For example, the cross-sectional design of the core members can be modified at any time to allow for a particular layout of internal conduits and raceways in the railing. In addition, the cross-sectional design of the core members may be modified to accommodate cover elements that feature new shapes and designs. Therefore, the illustrative embodiments of core elements shown, for example, in FIGS. 2, 7, 8, 17, 18, 27-30, 43-52, and 54-56 herein are not the only configurations contemplated in the present invention.

If desired, the cover elements may be covered with a decorative surface treatment, including but not limited to a special finish, coating, or external layer to enhance the appearance of the railing. Surface treatments may include simulated wood grain finishes, metallic jackets, or other effects. In FIG. 2, the cap member 114, base member 116 and cover member 124 are covered with a copper shell or jacket 157. Surface treatments are interchangeable with, or can be covered over by, other surface treatments. For example, a cover member 124 formed of a wood composite and having a wood grain finish may be covered by a copper jacket to change the style and appearance of the railing.

The cover elements are also interchangeable with other cover elements to change the appearance of the railing system. Cover elements are readily interchangeable on the core members 112, 122, without disturbing the structural characteristics of the railing assembly. That is, the detachable cover elements are configured to permit different decorative rail coverings to be installed over the core members, so that the railing system is not limited to one particular railing style or aesthetic effect. The appearance and style of the railing span 100 can be changed by simply detaching the cap member, base member and cover member, and replacing them with components having different finishes, coatings or shells. This may be desirable in instances where the adjacent building or deck is painted or sided with a color that does not match the existing railing style. Since the structural integrity of the railing system is provided by the core members, the owner or installer can change cover elements at any time without having to perform any additional structural testing or inspection.

Figure 7:
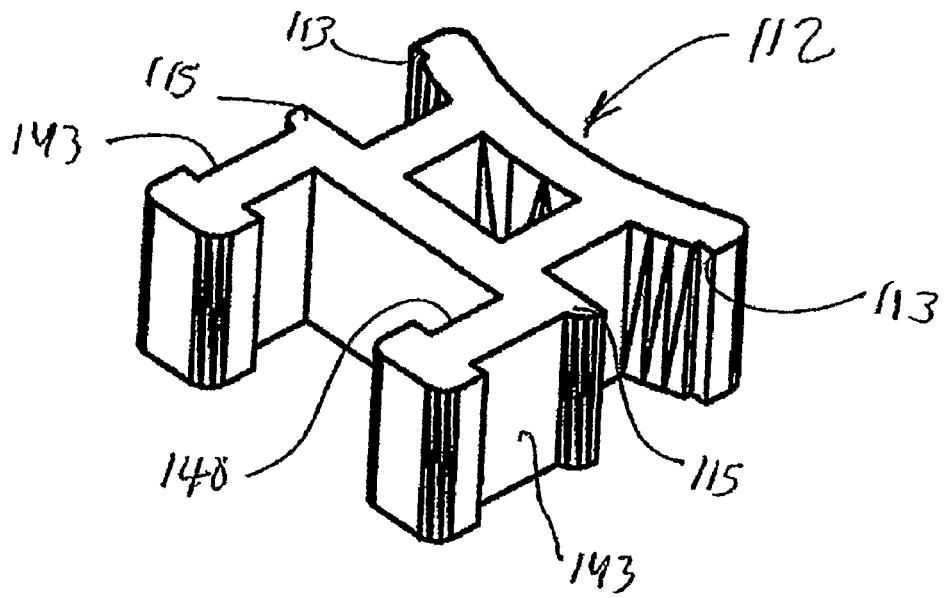
FIG. 7 is a perspective view of a first core member in accordance with the present invention, which is truncated for clarity.
Figure 8:
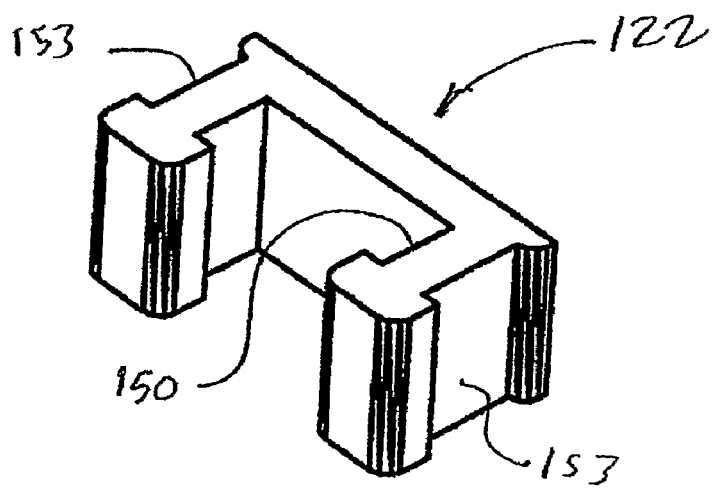
FIG. 8 is a perspective view of a second core member in accordance with the present invention, which is truncated for clarity.

Referring now to FIGS. 2, 7 and 8, the upper and lower core members 112, 122 respectively engage upper and lower ends of the balusters 130. The upper core member 112 forms an inverted channel 140 that receives the upper end 132 of each baluster 130. Similarly, the lower core member 122 forms an upright channel 150 that receives the lower end 134 of each baluster 130. The central portion of the base member 116 forms a routed opening 141 having dimensions generally equal to or slightly larger than the cross-sectional dimension of the upper end 132 of baluster 130. Similarly, the central portion of cover member 120 forms a routed opening 151 having dimensions generally equal to or slightly larger than the cross-sectional dimension of the lower end 134 of baluster 130. As alluded to earlier, the routed openings 141, 151 do not create fracture points or other structural concerns that affect the structural integrity of the railing span 100, since the core members 112, 122 attribute to substantially all of the load bearing capacity of the railing span.

The cap member 114 forms an inverted, generally U-shaped cap or cover that extends over the upper core member 112. The U-shaped cap member 114 forms a hollow interior 142 adapted to receive the upper portion 117 of the upper core member 112. The interior of the cap member 114 only engages a limited amount of surface area on the upper portion 117 of the upper core member 112, leaving one or more void spaces between the cap member and upper core member. In FIG. 2, the cap member 114 and upper core member 112 form a conduit or raceway 152. The conduit 152 extends along the top of the upper core member 112 and beneath the cap member 114. The cap member 114 connects over the upper core member 112 in a snug fit that forms a substantially air-tight enclosure around the conduit 152.

The conduit 152 forms a protective duct to house wiring, cable and other utility lines. In FIG. 2, the conduit 152 contains a first cable 154 and a second cable 156. The conduit 152 may be used to run a variety of utility lines through the railing, including but not limited to wires, cables, and lines associated with light fixtures, audio components, video equipment, computers, telephones, plumbing fixtures, grills, and machinery running on compressed air. The detachable cap member 114 allows easy access to the conduit 152 any time that utility lines are to be installed, serviced or replaced inside the conduit. Unlike closed tubular rail systems, the detachable assembly of the present invention allows wiring to be installed into an existing railing system with no cutting into the components or disconnection of rails from support structures.

From the foregoing, the core members and cover elements provide a novel combination with multiple advantages not offered by prior railing systems. As a general matter, the combination of structural core members and removable cover elements provides the unique benefit of permitting repairs, cosmetic upgrading, and installation of utility lines and other elements inside the railing system, all without disturbing the structural foundation of the railing system.

The combination of core members and cover elements also satisfies many competing interests. For example, the combination of core members and cover elements satisfy the competing interests of aesthetics versus ease of installation. In particular, the snap-on covers provide improved aesthetic appearance by concealing structural components, hardware, wires, cables and other components on the interior of the railing, while simplifying installation by allowing assembly without tools. The cover elements also satisfy the competing interests of aesthetics and structural integrity. Because the core members provide virtually all of the structural support for the railing, the decorative covers sustain minimal or no stress when load is applied to the railing. As a result, the decorative covers can be formed with routed openings, and balusters can be installed through routed openings in the decorative covers to form a virtually seamless appearance. The potential for fracture points around the routed openings is substantially eliminated because structural loads are almost exclusively absorbed by the core members and not the cover elements.

Figure 17:
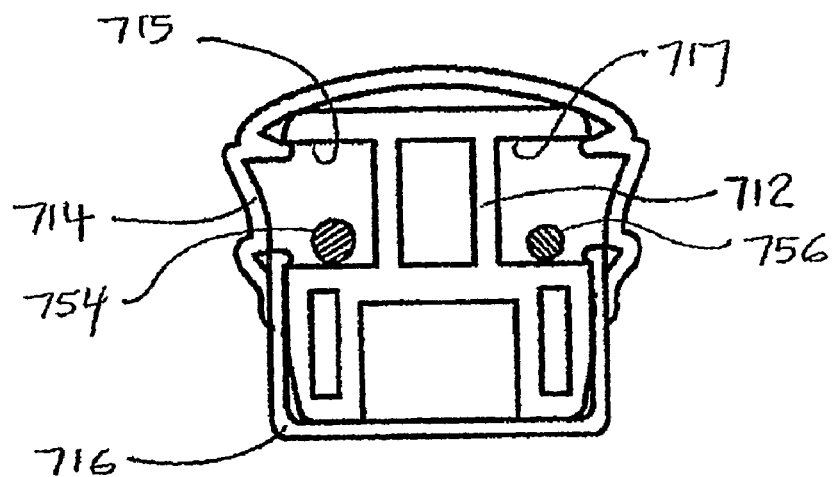
FIG. 17 is a cross section view of an upper rail member in accordance with the present invention, showing a third core member.
Figure 18:
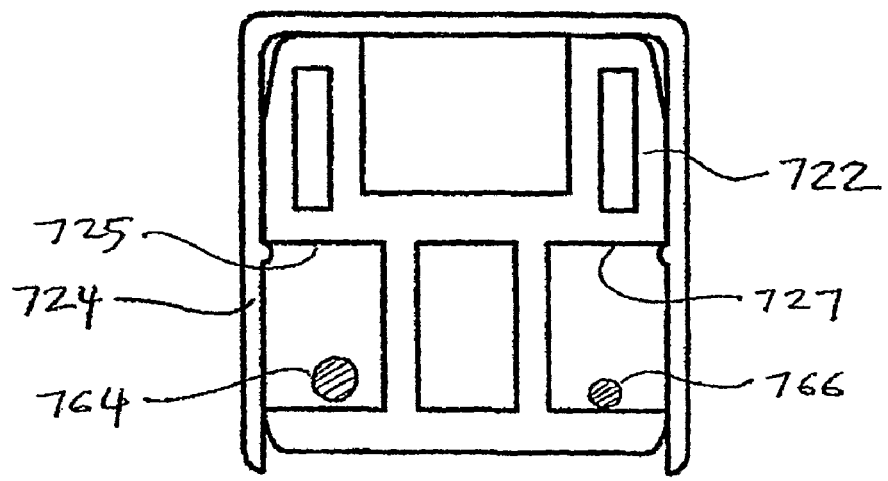
FIG. 18 is a cross section view of a lower rail member in accordance with the present invention, showing a fourth core member.

The assembly of the present invention may include a variety of core member configurations to support a railing and create conduits for concealing wires, cables and other utility lines. FIG. 17 shows an alternate upper core member 712 which is covered by a cap member 714 and a base member 716. The upper core member forms two side conduits 715, 717 that contain cables 754 and 756, respectively. FIG. 18 shows an alternate lower core member 722 which is surrounded by a cover member 724. Like upper core member 712, lower core member 722 forms two side conduits 725, 727, which allow utility lines to be housed in the lower rail. In FIG. 18, side conduits 725, 727 contain cables 764 and 766, respectively.

As noted earlier, the snapping connection between the cap member 114 and upper core member 112 allows the cap member to be readily attached and removed from the upper core member by hand, without the use of tools. If desired, fasteners or adhesives may be used to further secure the cap member and base member over the upper core element. The use of fasteners or adhesives will make removal of the cap member 114 from the upper core member 112 more difficult, however, in the event that the conduit 152 needs to be accessed for purposes of installing, maintaining or replacing wiring through the rail.

It is often desirable to limit or eliminate the number of visible fasteners, couplings and other mounting components in a railing assembly. Fasteners that are exposed on the exterior of a railing assembly can detract from the appearance of the railing system, and may be damaged from elements such as moisture. The core members and caps of the present invention are configured for connection to posts, columns or other support structures with the use of a minimal number of connector components that are completely concealed inside the railing system.

Figure 9:
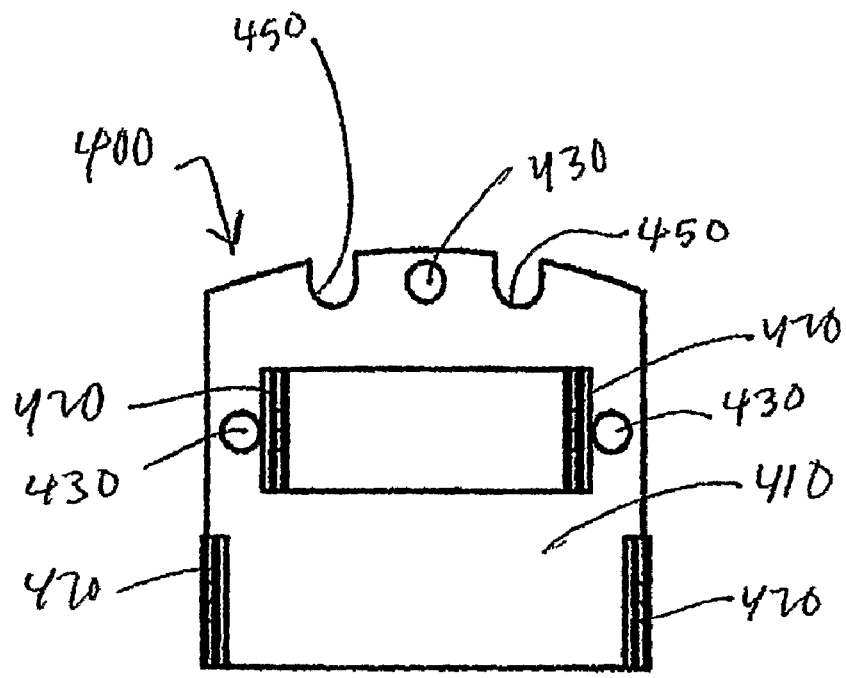
FIG. 9 is an elevation view of a first bracket in accordance with the present invention.
Figure 10:
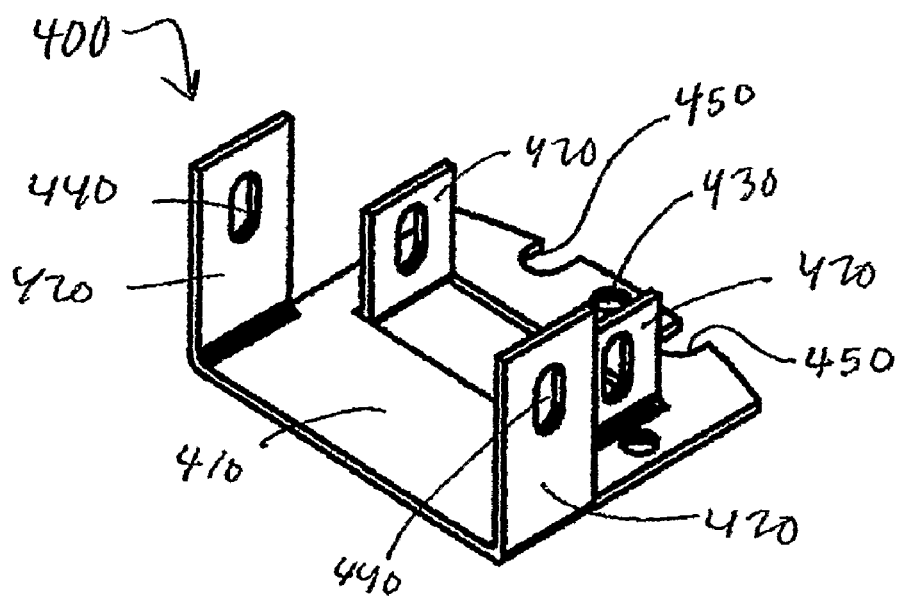
FIG. 10 is a perspective view of the first bracket of FIG. 9.

Referring to FIGS. 9-14, a variety of brackets are shown. FIGS. 9 and 10 illustrate a bracket 400 for joining an upper core member to a support structure, where the core member extends generally perpendicular or normal to the support surface. The bracket 400 has a back plate 410 and a number of tabs 420 that extend outwardly from the back plate. The back plate 410 has a number of mounting holes 430 that may be used to mount the bracket 400 to the support structure. The tabs 420 extend generally perpendicular to the back plate, and are configured to align with recesses on an upper core member (such as recesses 143 on upper core member 112 in FIG. 7) to join the core member to the bracket 400. The tabs 420 each have a slot 440 for inserting fasteners, such as screws. Once the tabs 420 are aligned with recesses on the upper core member, the fasteners may be inserted through the slots 440 and driven into the sides of the upper core member. Bracket 400 may also include one or more notches or apertures to allow wiring to extend from a core member into a post or other support structure without interruption. In FIGS. 9 and 10, the top edge of bracket 400 includes a pair of apertures 450. The apertures are adapted to receive a utility line from a conduit and pass the line into a support structure. The apertures 450 are rounded to limit the potential for slicing or gouging of wiring that passes through the bracket 400.

Figure 11:
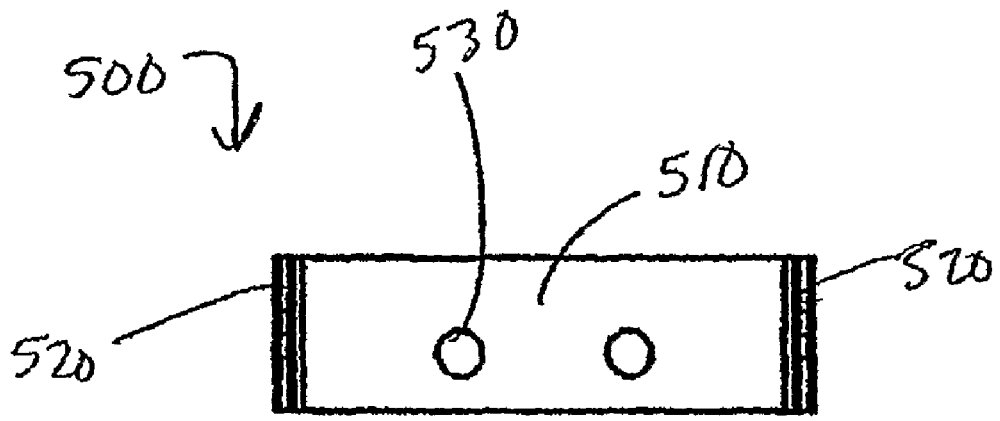
FIG. 11 is an elevation view of a second bracket in accordance with the present invention.
Figure 12:
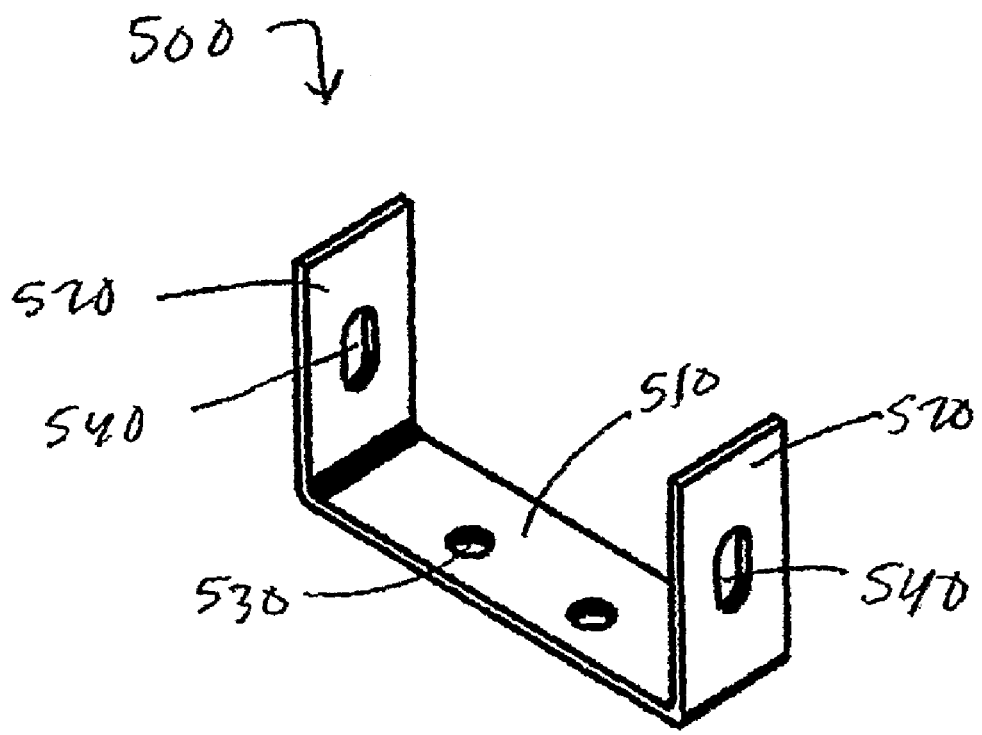
FIG. 12 is a perspective view of the second bracket of FIG. 11.
Figure 13:
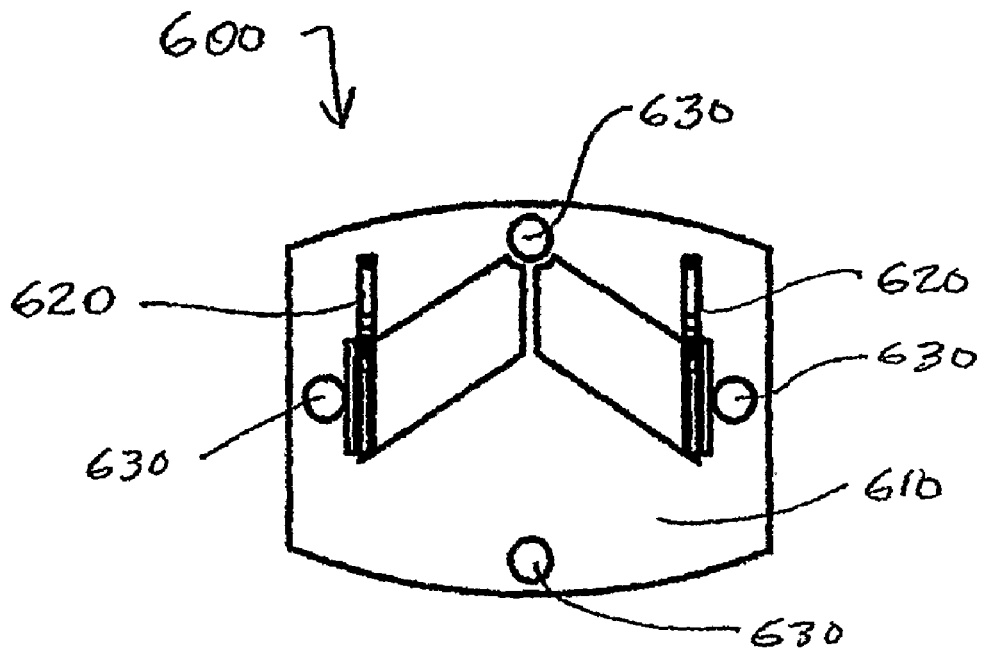
FIG. 13 is an elevation view of a third bracket in accordance with the present invention.
Figure 14:
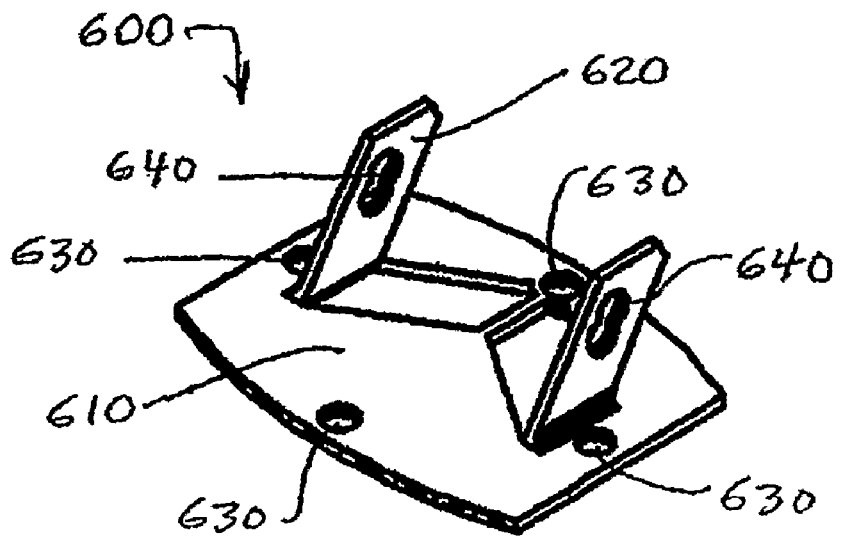
FIG. 14 is a perspective view of the third bracket of FIG. 13.

FIGS. 11 and 12 illustrate a bracket 500 for joining a lower core member to a support structure, where the core member extends generally perpendicular or normal to the support surface. The bracket 500 has a back plate 510 and a number of tabs 520 that cooperate with recesses on a lower core member (such as recesses 153 on lower core member 122 in FIG. 8). Bracket 500 has a number of mounting holes 530 and a number of fastener slots 540 that connect the bracket to the lower core member in the same general manner described above in connection with bracket 400. FIGS. 13 and 14 illustrate a bracket 600 for connecting either an upper core member or a lower core member to a support structure at a non-perpendicular angle, such as for a staircase railing. Bracket 600 has a back plate 610 and a number of tabs 620 that cooperate with the upper core member or lower core member. Bracket 600 has a number of mounting holes 630 and a number of fastener slots 640 that connect the bracket to the upper or lower core member in the same general manner described above in connection with brackets 400, 500.

Referring now to FIG. 51, another exemplary railing system 1000 is shown in accordance with the present invention. Railing system 1000 includes an upper core element 1112, a lower core element 1122 and a series of balusters 1130 extending between the upper core element and lower core element. A top bracket 800 connects the upper core element 1112 to a support structure, and the bottom bracket 900 connects the lower core element 1122 to a support structure. A decorative base member 1116 connects to the underside of upper core element 1112, and a decorative cover member 1124 connects over top of lower core element 1122. A decorative cap 1114 connects over top of upper core element 1112. As with the other components described above, the base member 1116, cover member 1124 and cap 1114 may be snapped onto the structural core members 1112, 1122 by hand, without the use of tools. In addition, the base member 1116, cover member 1124, cap 1114 and core members 1112, 1122 form one or more conduits for the passage of wires, cables and utility lines.

Referring now to FIGS. 19-22, the top bracket 800 shown in FIG. 51 is shown in more detail. Bracket 800 is similar to the bracket 400 shown in FIG. 9, and is especially suited for core members made from wood composite materials or other soft materials. Bracket 800 has a back plate 830 and a pair of mounting holes 842 that allow the bracket to be connected to a support structure in the same general manner described above in connection with bracket 400. A pair of tabs 820 extend outwardly from the back plate 830. The tabs 820 extend generally perpendicular to the back plate 830, and are configured to align with side recesses on an upper core member, such as side recesses 1114 on upper core member 1112 in FIGS. 27-30. The tabs 820 each have a slot 840 for inserting fasteners, such as screws. Once the tabs 820 are aligned with recesses on an upper core member, fasteners may be inserted through the slots 840 and driven into the sides of the upper core member.

The bracket 800 includes a pair of ribs 850 on each tab 820. The ribs 850 extend parallel to the longitudinal axis of the tabs 820, forming two pairs of opposing ribs that face inwardly with respect to the bracket. When the bracket tabs 820 are inserted into the side recesses on an upper core member, the ribs 850 engage the sides of the core member. Referring to FIG. 29, for example, the ribs 850 extend into the recesses 1114 and engage the sides of upper core member 1112. The width of the space between opposing ribs 850 is slightly less than the width between the opposing recesses 1114. As a result, the ribs 850 press inwardly into the material of the upper core member 1112, providing a secure, press-fit connection.

The ribs 850 may be configured in a variety of cross-sectional shapes and arrangements. The cross sectional shape and cross-sectional area of the ribs will affect, among other things, the amount of force required to mount the core members onto the brackets. Suitable cross-sectional shapes include, but are not limited to, triangular (or "V-shaped"), rectangular, square or semi-circular. The ribs may have a constant cross-sectional area along their length, or a gradually decreasing cross-sectional area that starts with a maximum area in proximity to the back plate and tapers to a minimum area as the rib extends away from the back plate. With a tapered cross section, the tabs initially slide onto the core members with little or no resistance. As the core member is advanced further over the tabs, the ribs gradually penetrate deeper into the core member, forming a tight fit.

Referring now to FIGS. 23-26, the bottom bracket 900 for joining a lower core member to a support structure is shown. Bottom bracket 900 has a back plate 930 and a pair of mounting holes 942 that allow the bracket to be connected to a support structure in the same general manner described above in connection with bracket 800. A pair of tabs 920 extend outwardly from the back plate 930. The tabs 920 extend generally perpendicular to the back plate 930, and are configured to align with the side walls of the inner channel in a lower core member. The tabs 920 each have a slot 940 for inserting fasteners, such as screws. Once the tabs 920 are inserted into the channel in a lower core member, fasteners may be inserted through the slots 940 and driven into the sides of the lower core member. A pair of ribs 950 extend parallel to the longitudinal axis of the tabs 920. The ribs extend outwardly from the sidewall of each tab 920, forming two pairs of opposing ribs that face outwardly with respect to the bracket. The distance measured between the outermost portions of the ribs is slightly greater than the width of the inner channel in the lower core member. As a result, the ribs 950 press inwardly into the material of the lower core member when the bracket 950 is connected to the lower core member.

Some core member materials are prone to expansion and contraction under different conditions. For example, aluminum is prone to thermal expansion, and wood composite may be prone to moisture expansion. Therefore, the bracket and core member are preferably connected in an arrangement that allows the core member to expand and contract. Referring to FIG. 30, bracket 800 is connected to core member 1112 with the tab 820 only partially inserted into the side recess 1114 of the core member. That is, the back plate 830 is not pressed flush against the end of the core member 1112. A small gap or clearance space "X" is maintained between the back plate 830 and the end of the core member 1112. In this arrangement, space is provided between the bracket 830 and the end of the core member 1112 to allow the core member to expand. If space for expansion is not provided, the core member may become compressed between support structures as the core member expands, potentially causing damage to the core member or fasteners that support the core member.

Referring now to FIGS. 31-34, another top bracket 2000 is shown which is intended for use with inclined railings, such as stair rails. Bracket 2000 includes a back plate 2030 and a pair of tabs 2020 that extend generally perpendicularly from the back plate. Each tab 2020 includes a pair of ribs 2050 that gradually decrease in cross-sectional area as the ribs extend away from the back plate 2030. The tabs 2020 include holes 2040 for attaching the tabs to a core member. Back plate 2030 includes a pair of mounting holes 2042 for mounting the bracket 2000 to a support structure.

As shown in FIG. 34, each tab 2020 has a first top edge surface 2022 and a second top edge surface 2024 adjacent the first top edge surface. The first top edge surface 2022 extends at a first angle with respect to the plane formed by the back plate 2030. The second top edge surface 2024 extends at a second angle with respect to the plane formed by the back plate 2030. The second angle is less than the first angle, such that the first and second top edge surfaces 2022, 2024 extend at different pitches. The different pitches allow bracket 2000 to support an upper core element at a variety of angles. That is, at least one of the edges 2022, 2024 will more or less conform with the inner edge of an inclined rail. The top edge surfaces 2022, 2024 are preferably configured to support rails inclined at angles ranging from about 20 degrees to about 50 degrees. This range is not intended to be the only range contemplated, as smaller or larger angles may also be desirable in certain circumstances.

Referring now to FIGS. 35-38, another bottom bracket 3000 is shown which is intended for use with inclined railings, such as stair rails. Bracket 3000 includes a back plate 3030 and a pair of tabs 3020 that extend generally perpendicularly from the back plate. Each tab 3020 includes a pair of ribs 3050 that gradually decrease in cross-sectional area as the ribs extend away from the back plate 2030. Back plate 3030 includes a pair of mounting holes 3042 for mounting the bracket 3000 to a support structure. As with the top bracket 2000 of FIGS. 31-34, the tabs 3020 in bottom bracket 3000 have first and second top edges 3022, 3024 that extend at different pitches to support a lower core element at a variety of angles.

Referring again to FIGS. 1 and 2, the holes that extend through the decorative core element covers, such as base member 116 and cover member 124, may be routed. For stair rails and other inclined railings, the balusters will extend through the decorative cover at a non-perpendicular angle. Problems with appearance may occur where the opening is routed at an angle perpendicular to the decorative cover, or at an angle different to the angle in which the baluster extends through the cover. In such cases, the edges of the opening are not parallel to the sides of the baluster. When the edges of the opening are not parallel to the sides of the baluster, the opening will form gaps around the baluster that expose the sidewalls of the routed opening. Visible sidewalls can detract from the appearance of the railing assembly. Moreover, the gaps between the baluster and cover can collect dirt and other particles. Over time, dirt and other particles that accumulate on the sidewalls can make the sidewalls even more visible.

It has been discovered that the appearance of stair railings and other inclined railings is greatly improved by routing holes for balusters at an angle that is equal to, or closely corresponds with, the angle of the railing. In one method of manufacture, a special milling machine is used to form the openings in the base member and cover member. A conventional milling machine is modified by tilting the router head to an angle corresponding to the pitch at which the core elements will extend in the finished installation. Once the router head is set, the router bit is plunged into the decorative cover at the appropriate angle to cut the opening. In the case of square balusters, the opening will have two sides that extend perpendicularly through the cover, and two sides that extend at a non-perpendicular angle corresponding to the angle of pitch. When the balusters are installed through the openings in the finished installation, all four sides of the balusters will extend parallel to the four sides of the holes, forming a flush appearance.

Figure 41:
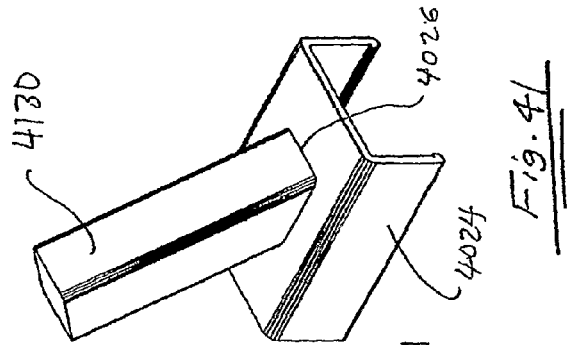
FIG. 41 is a perspective view of the component of FIG. 39 with a baluster inserted through the component, wherein the baluster is also truncated for clarity.
Figure 39:
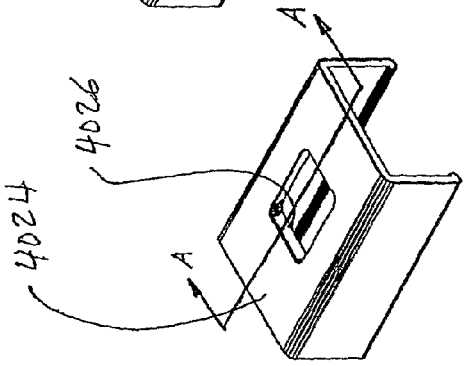
FIG. 39 is a perspective view of a decorative cover component, wherein the component is truncated for clarity.
Figure 40:
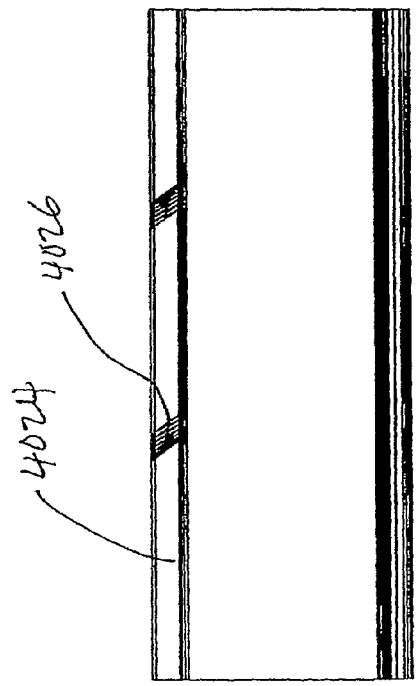
FIG. 40 is a side cross-sectional view of the component shown in FIG. 39 taken through line A-A in FIG. 39.
Figure 42:
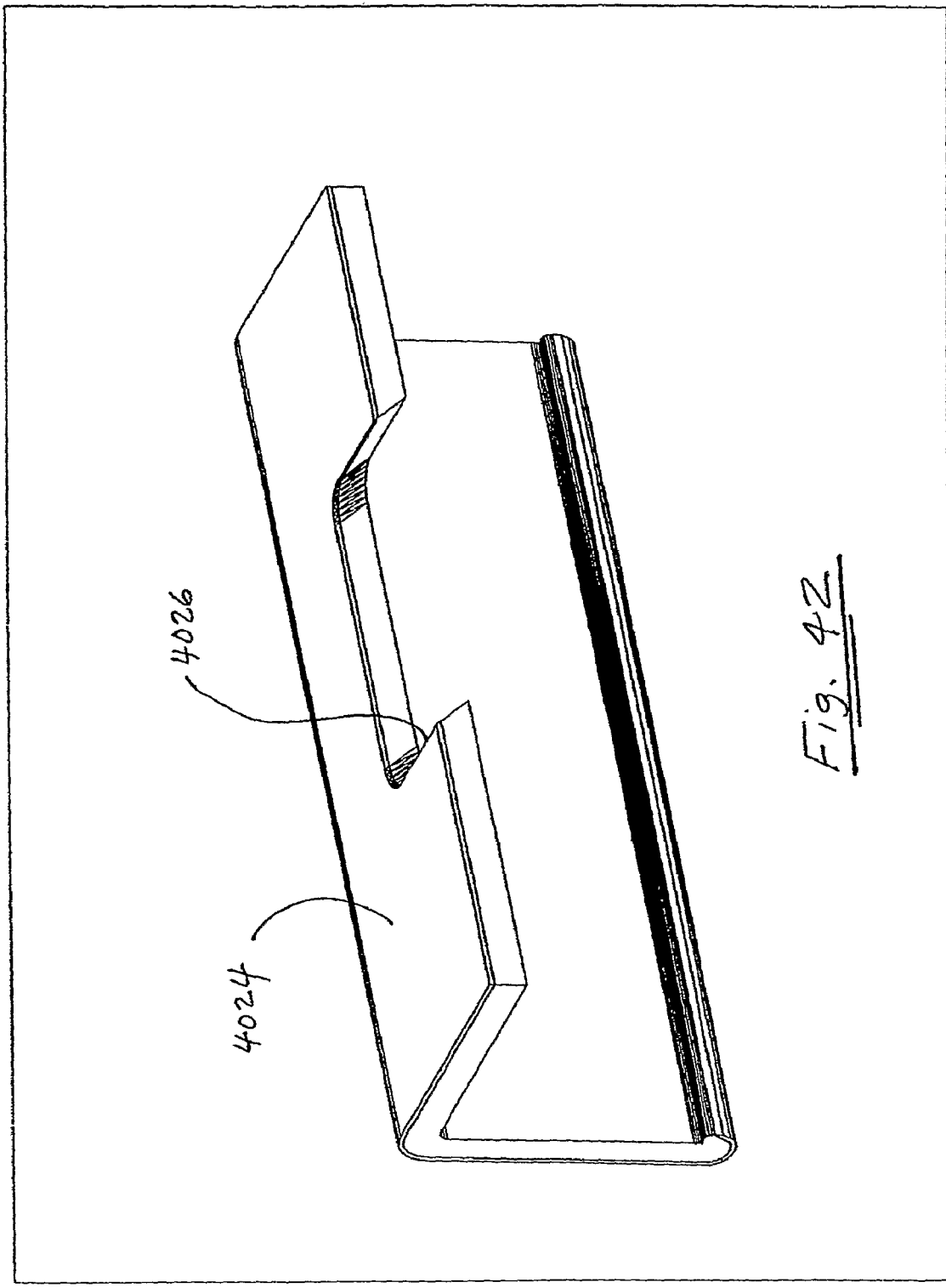
FIG. 42 is a perspective cross-sectional view of the component in FIG. 39 taken through line A-A in FIG. 39.

Referring to FIGS. 39-42, various views of a decorative cover member 4024 having an angled opening 4026 are shown. The angled opening 4026 is formed by two sides that extend perpendicularly through the cover, and two sides that extend at a non-perpendicular angle. The angled opening 4026 is adapted to receive a baluster 4130 that intersects the cover member 4024 at a non-perpendicular angle. In a stair rail installation, the cover member 4024 would be inclined at an angle corresponding to the pitch of the staircase, and the baluster 4130 would preferably extend vertically. The sidewalls of the routed opening 4026 are cut so that they are parallel to the sides of the baluster in the final assembly, with the opening preferably routed to dimensions that provide only a very small clearance for the baluster. Using this routing technique, the sidewalls of the routed hole are not visible on the exterior of the railing where the baluster 4130 penetrates the cover member 4024. The baluster 4130 passes through the cover member 4024 in a smooth transition, as shown in FIG. 41.

The angle of incline for staircases, ramps or other inclined structures varies. If the angle of incline of a particular installation is significantly different from the angle of the routed hole, the sidewalls of the cover member will be very visible where the baluster penetrates the cover member. In the preferred system, a selection of cover members and base members are provided having openings routed at different angles to accommodate a limited range of stair pitches. For example, it has been discovered that manufacturing two types of cover members to address two separate ranges of stair pitch is effective to accommodate virtually all stair pitches. In this approach, two cover member parts are manufactured, with one cover member having routed openings at a first angle, and the other cover member having routed openings at a second angle. The first angle would be appropriate for a first range of stair pitches, and the second angle would be appropriate for a second range of stair pitches. It has been found, for instance, that a hole angle of about 35 degrees relative to horizontal accommodates a range of stair pitches between about 29 to about 35 degrees relative to horizontal, and a second hole angle of about 41 degrees relative to horizontal accommodates a range of stair pitches between about 35 to about 41 degrees relative to horizontal.

In manufacturing cover members with angled routed openings, two or more routers may be used, with each router having a router bit angled at a unique angle to fabricate components suitable for a specific range of stair pitches. For example, a first router may have a bit angled at about 35 degrees relative to horizontal, and the second router may have a bit angled at about 41 degrees relative to horizontal.

Referring back to FIGS. 1 and 2, the cap member 114 and upper core member 112 may be snapped together and detached from one another by hand. This has the advantage of allowing broken or damaged balusters to be removed and replaced without disassembling the core members from the adjacent posts or other support structures. A damaged baluster can be replaced by detaching the base member 116 from the upper core member 112 and sliding the base member down along the balusters 130 until it reaches a midsection of the balusters. Similarly, the cover member 124 is detached from the lower core member 122 and slid upwardly along the balusters 130 to the midsections of the balusters. In this arrangement, the two ends of the damaged baluster are no longer retained in vertical alignment by the routed openings in the base member 116 and cover member 124. As a result, the damaged baluster can be tilted within the channels of the upper and lower core members 112, 122 until the ends of the baluster clear the channels. Once the ends of the baluster clear the channels, the baluster can be maneuvered out of the span, and a replacement baluster can be inserted through the vacant openings in the base member 116 and cover member 124. An end of the replacement baluster is inserted into the channel of the upper core member 112, and the opposite end of the replacement baluster is inserted into the channel of the lower core member 122. The base member 116 is then raised along the balusters 130 and reattached to the underside of the upper core member 112. Similarly, the cover member 124 is lowered along the balusters and reattached to the lower core member 122, completing the repair.

Referring now to FIGS. 53A-53H, a method for assembling a railing system in accordance with the present invention will now be described. The method assumes that posts are installed as the support structures. It will be understood that other support structures may be used, including but not limited to porch columns and walls.

After the posts are installed, the lower core member and bottom bracket are anchored into the post. In FIG. 53A, the brackets are anchored using screws. Once the lower core member is connected to the posts, the pre-routed cover member is lowered over the lower core member, as shown in FIG. 53B, and snapped onto the lower core member. As described above, the caps and cover members are resiliently flexible, allowing the installer to connect the caps and cover members to the core members by hand without the need for tools.

Referring to FIG. 53C, balusters are inserted into the pre-routed holes of the cover member. Once all of the balusters are in place, the pre-routed base member cover is slid down onto the balusters and lowered to a mid span portion of the balusters so that the cover does not obstruct the top ends of the balusters. The upper core member is then cut to the proper length, as shown in FIG. 53D. As noted above, the upper core member may be formed of a wood composite which has the advantage of cutting relatively easily. The upper core member is positioned over the balusters and anchored to the posts using the upper brackets, as shown in FIGS. 53E and 53F.

Referring next to FIG. 53G, the cap cover is aligned over top of the upper core member and snapped into place. The base cover is then slid upwardly along the balusters and snapped onto the underside of upper core element, as shown in FIG. 53H.

Referring now to FIGS. 43-50, an alternate railing assembly 5000 is shown. The railing 5000 includes an upper core member 5012, a lower core member 5022 and a panel 5030 supported between the upper core member and lower core member. The upper core member 5012 has a bottom section that connects with a decorative base member 5016. The lower core member 5022 has a top section that connects with a decorative cover member 5024. As with the previous embodiments, the decorative base member 5016 and cover member 5024 may be adorned with various paint colors, finishes, metallic jackets or other surface enhancements to achieve a desired look.

The upper and lower core members have channels 5050 that connect with the decorative base member 5016 and cover member 5024. The decorative base member 5016 and cover member 5024 are preferably identical in structure, thereby reducing the number of different components used in the railing assembly 5000. The decorative base member 5016 and cover member 5024 extend in an opposing relationship in the installed railing assembly 5000, as shown in FIGS. 43 and 45.

The panel 5030 may be formed of a variety of materials, depending on the desired structural and aesthetic properties of the railing, as well as privacy considerations. Suitable materials include transparent materials, translucent materials, or opaque materials. Suitable transparent materials for the panel 5030 include but are not limited to glass or acrylic plastic. Where glass is used, it may be desirable to use a tinted glass to partially shade the area inside the railing. Tinted or reflective panel materials provide a limited amount of privacy for areas inside the railing.

As noted above, the decorative base member 5016 and cover member 5024 are preferably identical in structure. For purposes of this description, the decorative cover member 5024 will be described, with the understanding that the same description applies to the decorative base member 5016. Referring to FIGS. 47-50, the cover member 5024 includes a resilient flexible body portion 5025. The body portion 5025 is generally U-shaped and includes a panel face 5026 and a pair of side faces 5027 on each end of the panel face. Each side face 5027 has a rim 5028 that extends inwardly with respect to the body portion 5025. The width of the U-shaped body portion 5025 is generally equal to the width of the lower core member 5022. The rims 5026 are generally rounded and form hooks or ledges 5031 that engage the lower core member 5022 when the cover member 5024 is attached to the lower core member.

During assembly, the cover member 5024 is pressed downwardly over the lower core member 5022. As the cover member 5024 is pressed downwardly, the rounded rims 5028 glide over the wider portions of the lower core member 5024 and deflect outwardly. Once the rims 5028 pass over the entire lower core member 5022, the resiliently flexible property of the body portion 5025 causes the side faces 5027 to snap inwardly. The rims 5028 snap around the flat bottom portion of the lower core member 5022, and the ledges 5031 rest against the flat bottom portion to securely connect the cover member to the lower core member, as shown in FIGS. 44 and 45.

The panel 5030 is supported along a first edge by the lower portion of the upper core member and supported along a second edge by the channel in the lower core member. In particular, a groove 5033 extends along the panel face 5026, and is configured to support the lower edge of panel 5030. The lower core element 5022 and cover member 5024 may be configured such that the groove 5033 is either centered along the railing or offset to one side. In FIGS. 45 and 49, the groove 5033 extends along the center line of the cover member 5024. The groove 5033 extends between a pair of stiffening sections 5029 formed in the cover member 5024. The underside of the groove 5033 and stiffening sections 5029 form a contour that cooperates with the interior channel 5050 of lower core member 5024. When the cover member 5024 is snapped onto the lower core member 5022, the stiffening sections 5029 preferably engage the mouth of the channel 5050 in a frictional engagement. The frictional engagement provided by the stiffening sections 5029 in and the engagement of the rims 5026 on the exterior of the lower core member 5022 securely hold the cover member 5029 in a stable position on the lower core member. As such, the panel 5033 is securely connected with the lower core element 5022.

The groove 5033 has a width that is generally equal to or slightly larger than the width of the panel 5030. In a preferred embodiment, the groove 5033 includes an elastic insert 5032 that provides a cushion between cover member 5024 and the edges of panel 5030. The cushion or insert 5032 lines the walls of the groove and forms a U-shaped channel to receive an edge of the panel 5030. The insert 5032 is preferably formed of a resilient material such as rubber, which is firm enough to form a tight fit in the groove 5033, but soft enough to limit the potential for chipping or damaging of the panel 5030 when the panel is mounted into the groove.

All of the foregoing railing assemblies may be distributed and sold in a variety of ways. For example, the railing assembly may be sold to building contractors, or to homeowners interested in installing the railing assembly themselves. In a preferred method of distribution, railing components are packaged and sold in the form of kits that simplify purchasing. For example, components of the railing assembly may be sold in boxed sets, with each boxed set containing components that constitute a unit or modular portion of a railing system. For example, the boxed set may contain all the structural components needed to construct a single span of railing between posts. Alternatively, the boxed set may contain all the structural and decorative components needed to construct a finished span of railing between posts. Such a boxed set may include a top beam, a bottom beam, a set of balusters, a decorative cap member, a decorative base member and a decorative cover member.

Figure 52:
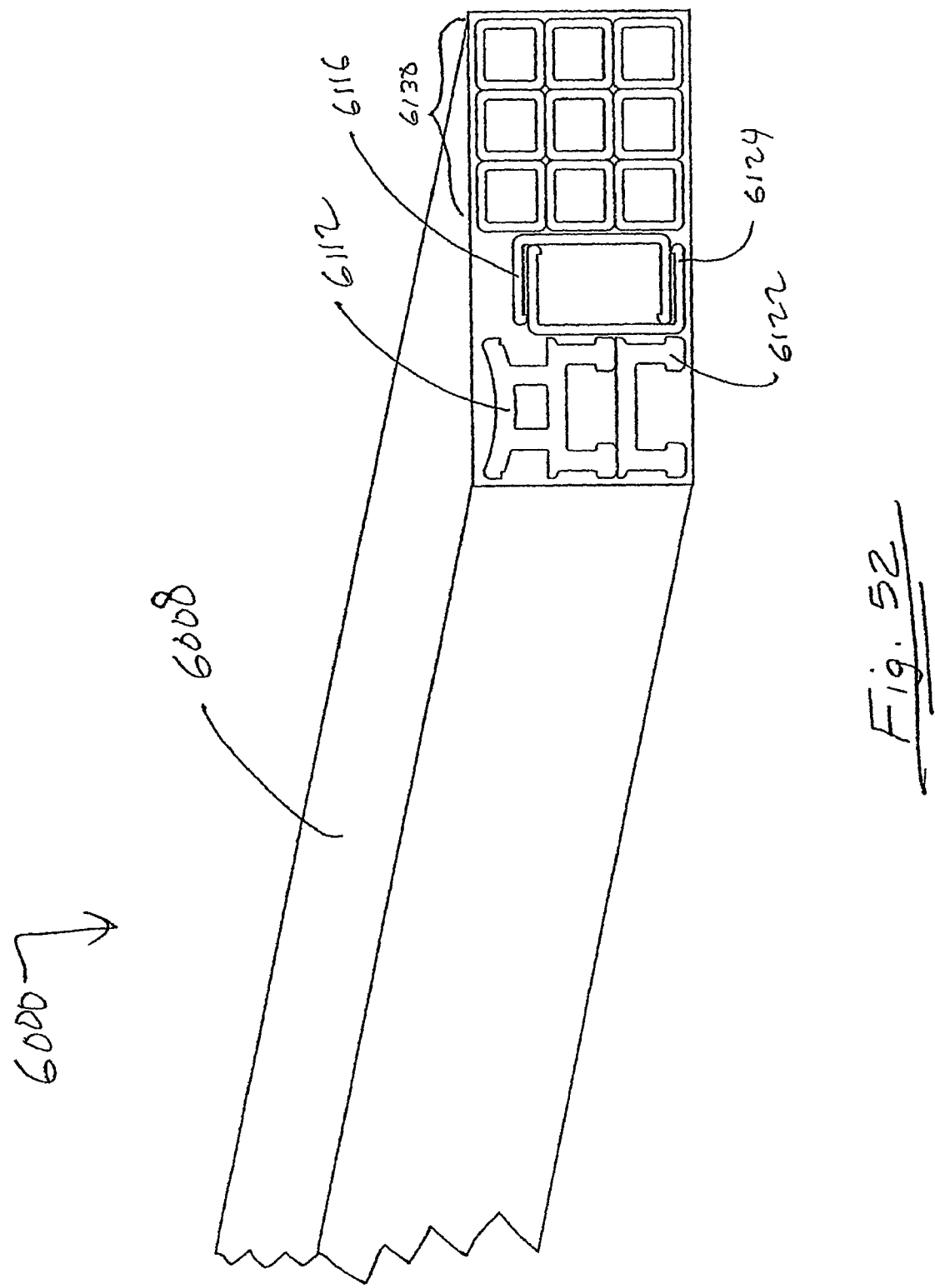
FIG. 52 is a truncated schematic view of railing components packaged in a boxed set in accordance with the present invention.

Referring to FIG. 52, a boxed set 6000 in accordance with the present invention includes a box container 6008, an upper core member 6112, a lower core member 6122, a pair of decorative covers 6116, 6124 for the upper and lower core members, and nine balusters 6130. Other combinations of components and forms of packaging may also be desirable. The boxed sets may be fabricated for any length of span, such as a six foot length, eight foot length, ten foot length, or twelve foot length. Each boxed set would provide all the fasteners needed to install the span. As noted earlier, the preferred railing systems of the present invention require very few fasteners and hardware.

By packaging components in sets corresponding to individual railing spans of a given length, the professional installer or homeowner can easily determine how much product to purchase for a given project. The installer or homeowner would simply determine the total length of the proposed railing system and divide the total length by the unit length provided in each kit. The result would be the number of kits that should be purchased. This ensures that the correct number of components and fasteners are ordered, and avoids the miscalculations that can be made when ordering railing components in bulk quantities.

In certain instances, it may be desirable to package and sell components individually. For example, components may be packaged and sold as optional upgrades or accessories for use with separately sold boxed sets. Each accessory would be packaged and sold separately, allowing the customer to order only those types and quantities of accessories that are needed. The individual accessories are preferably packaged with appropriate labeling or indicia to show which boxed sets are compatible with the accessories. Accessories and upgrades may include decorative caps, decorative base members, decorative cover members, metallic jackets or other decorative additions. For example, accessories may include decorative caps stained or painted in a certain color tone. Alternatively, the decorative accessories and upgrades may be sold in the form of coordinated kits. For example, a set of wood tone caps and cover members may be packaged with a set of copper jackets to create a kit for upgrading a railing structure. The accessory kits preferably contain all the accessory parts needed to upgrade a single span of railing, similar to the railing boxed sets described above.

As noted above, the components described herein may be formed of various materials, including but not limited to aluminum or high strength composite materials containing wood or polymers. Composite materials may include wood-plastic composites or wood fiber composites. In a preferred embodiment, the components are formed of a wood fiber composite formed of dried wood fibers encapsulated in thermoplastic polymer.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

We claim:

1. A railing system comprising:
   an elongated upper rail;
   an elongated lower rail; and
   a plurality of balusters extending between the upper rail and the lower rail;
   the upper rail comprising:
   an elongated upper core member comprising an upper portion and a lower portion, the upper portion comprising an upper flange having opposing longitudinal edges each comprising a cap connector, and the lower portion comprising a lower flange having opposing longitudinal edges each comprising a base connector, and a pair of opposing sidewalls extending from the lower flange and forming an elongated inverted channel in the core member;
   a cap member comprising an elongated central body having a pair of opposing sidewalls defining a channel receiving the upper portion of the core member, each sidewall of the cap member having a cap flange adjacent the central body of the cap member and in interlocking engagement with a respective one of the cap connectors of the core member such that the central body of the cap member engages the longitudinal edges of the upper flange;
   wherein an upper surface of the upper flange of the core member and an inner surface of the central body of the cap member face each other and diverge away from one another to form at least one conduit adapted to carry one or more utility lines inside the railing system; and
   a base member comprising an elongated central body having a pair of opposing sidewalls defining a channel receiving the lower portion of the core member, each sidewall of the base member having a base flange in interlocking engagement with a respective one of the base connectors of the core member, the central body of the base member comprising a plurality of openings aligned with the inverted channel of the core member;
   wherein the plurality of balusters extend through the plurality of openings in the base member and into the inverted channel in the core member to connect the plurality of balusters with the upper rail; and
   wherein the sidewalls of the cap member and the sidewalls of the base member engage one another in an overlapping relationship such that the cap member and the base member substantially enclose and conceal the core member.

2. The railing system of claim 1 comprising a utility line extending through said conduit between said core member and said cap member, wherein said utility line is concealed beneath said cap member.

3. The railing system of claim 2, wherein the utility line comprises a line associated with a light fixture, an audio component, a video component, a computer, a telephone, a plumbing fixture, a grill, or a device powered by compressed air.

4. The railing system of claim 1, wherein each of said plurality of balusters comprises an upper end and a lower end, said upper end engaging with the base member.

5. The railing system of claim 4, wherein the plurality of openings in the base member comprise routed openings.

6. The railing system of claim 5, wherein the base member extends along a longitudinal axis, and the routed openings extend through the base member at an acute angle with respect to the longitudinal axis of the base member.

7. The railing system of claim 6, wherein the angle is between about 29 and about 41 degrees.

8. The railing system of claim 1 comprising a lower core member extending generally parallel with said upper core member, said lower core member comprising a channel facing the lower portion of the upper core member.

9. The railing system of claim 8, the lower rail comprising a cover extending over the lower core member, said cover comprising a routed opening generally aligned with the channel in the lower core member, said channel adapted to receive a lower end of one of said plurality of balusters, said lower end extending through the routed opening in the cover and engaging with the lower core member.

10. The railing system of claim 9, comprising a surface treatment on at least one of said cap member, base member and cover.

11. The railing system of claim 10, wherein the surface treatment comprises a metallic jacket.

12. The railing system of claim 9, wherein said railing system has a load bearing capacity operable to resist deflection of the railing, said upper and lower core members being mounted to a support structure to provide said load bearing capacity, said cap member, base member and cover member comprising decorative components that are detachable from said core members without reducing the load bearing capacity of the railing system.

13. The railing system of claim 1, comprising a bracket and mounting hardware connected with said upper core member, said bracket and mounting hardware being disposed within and completely concealed by said cap member and said base member.

14. The railing system of claim 13, wherein the bracket comprises one or more inwardly facing ribs configured for connection with the upper core member in a press fit.

15. The railing system of claim 14, wherein the bracket comprises a socket for receiving an end of the upper core member, the socket forming a clearance gap between the bracket and the end of the upper core member to accommodate expansion of the upper core member.

16. The railing system of claim 1, wherein one of the upper core member and the cap member is concavely shaped at a location adjacent the other of the upper core member and the cap member to form said at least one conduit.

17. The railing system of claim 1, wherein the upper core member and the cap member each comprise concave shapes forming opposing sides of said conduit.

* * * * *